United States Patent [19]

Herbert

[11] Patent Number: 5,131,893
[45] Date of Patent: * Jul. 21, 1992

[54] ENDLESS METAL BELT ASSEMBLY WITH MINIMIZED CONTACT FRICTION

[75] Inventor: William G. Herbert, Williamson, N.Y.

[73] Assignee: Xerox Corporation, Stamford, Conn.

[ * ] Notice: The portion of the term of this patent subsequent to Sep. 17, 2008 has been disclaimed.

[21] Appl. No.: 633,604

[22] Filed: Dec. 24, 1990

[51] Int. Cl.5 .............................................. F16G 5/00
[52] U.S. Cl. ...................................... 474/260; 205/77; 474/270
[58] Field of Search ....................................... 204/3-4, 204/9, 13, 26, 43.1, 40-42, 281; 474/259-260, 270, 272, 257; 205/77, 138

[56] References Cited

U.S. PATENT DOCUMENTS

| | | | |
|---|---|---|---|
| 2,569,367 | 9/1951 | Bradner et al. | 205/73 X |
| 3,604,283 | 9/1971 | Van Doorne | 74/233 X |
| 3,799,859 | 3/1974 | Wallin | 204/216 |
| 3,844,906 | 11/1974 | Bailey et al. | 204/9 |
| 3,876,510 | 4/1975 | Wallin et al. | 205/73 |
| 3,959,109 | 5/1976 | Hambling et al. | 204/212 |
| 3,970,527 | 7/1976 | Brown | 204/9 |
| 4,067,782 | 1/1978 | Bailey et al. | 204/25 |
| 4,501,646 | 2/1985 | Herbert | 204/4 |
| 4,530,739 | 7/1985 | Hanak et al. | 204/4 |
| 4,579,549 | 4/1986 | Okawa | 474/242 |
| 4,650,442 | 3/1987 | Parsons | 474/29 |
| 4,661,089 | 4/1987 | Cuypers | 474/242 |
| 4,664,758 | 5/1987 | Grey | 204/3 |
| 4,787,961 | 11/1988 | Rush | 204/9 |
| 4,902,386 | 2/1990 | Herbert et al. | 204/9 |
| 5,049,242 | 9/1991 | Murphy et al. | 205/77 |
| 5,049,243 | 9/1991 | Herbert et al. | 205/77 |

OTHER PUBLICATIONS

Keeton, C. R., *Metals Handbook*, 9th Edition, "Ring Rolling", pp. 108-127.

*Primary Examiner*—Ramon S. Britts
*Assistant Examiner*—Roger J. Schoeppel
*Attorney, Agent, or Firm*—Oliff & Berridge

[57] ABSTRACT

An endless metal belt assembly is made with opposing adjacent belt surfaces that may contain a roughened surface containing protuberances, indentations and/or pits and are configured such that a lubricant can be held and circulated between the adjacent surfaces. The roughened surface may be formed by an electroforming process in which one or more components of the electroforming bath and the operating parameters of the electroforming bath are adjusted to create the protuberances, indentations and/or pits. A belt assembly formed in this manner is useful as a driving member for a continuously variable transmission.

26 Claims, 9 Drawing Sheets

ENDLESS METAL BELT ASSEMBLY WITH MINIMIZED CONTACT FRICTION

BACKGROUND OF THE INVENTION

This invention relates in general to endless metal belt assemblies, and in particular, to endless metal belt assemblies with multiple belts in which the belt surfaces trap, circulate and carry a lubricant, thus minimizing friction between the belts.

Endless metal belt assemblies have many uses, including their use as a drive member for a continuously variable transmission (CVT). When used in this manner, an endless metal belt assembly must have certain properties and characteristics to operate efficiently.

The endless metal belt assemblies must be made of a material which is strong, exhibiting both a high fatigue strength which reduces the likelihood of failure from fatigue fracturing, and high compressive strength and tensile strength, which enable the belt assembly to withstand the demands imposed by the bending stresses inherent in the operation of the pulley system of the CVT. The belt material must be able to stretch without yielding, and be flexible. It must be durable with a high wear resistance, because replacement is costly and takes the machine out of use. The belt material must have high processability and be capable of being fashioned into a very thin belt which can be manufactured to a highly precise circumferential length. In the event of multiple belts forming the continuously-variable transmission belt assembly, this high precision of circumferential length for each successive belt is especially critical for the formation of equal gaps between pairs of adjacent belts. The metal belt assembly must have exacting tolerances with respect to the distance between belts, as well as minimal friction between belts. Thus, the adjacent opposing surfaces of the belts must be conducive to maintaining a lubricated state within the spaces between the belts. Each belt of a belt assembly must be capable of equal load sharing. The outer surface of the belt must have sufficient friction to transfer the load from the driving member pulley to the driven member pulley.

U.S. Pat. No. 3,604,283 to Van Doorne discloses a flexible endless member consisting of one or more layers of steel belts for use with a continuously-variable transmission, containing a driving mechanism which comprises a driving pulley with a V-shaped circumferential groove and a driven pulley with a V-shaped circumferential groove. The flexible endless member, which has chamfered (beveled) flanks, interconnects and spans the pulleys. The diameters of the pulleys can be automatically and steplessly varied with regard to each other in such a way that different transmission ratios can be obtained.

Endless metal belts used for belt drives can be formed by several methods. One manufacturing method disclosed in *Metals Handbook*, 9th edition, employs a "ring rolling method" wherein a metal, cylindrical tube is cut to a specified length and then an innermost belt is formed on the ring-rolling machine, making the ring wall thinner and the circumferential length longer. Subsequently, a number of additional belts wherein the diameter of each belt is slightly larger than that of the previously formed belt, may be similarly formed. The belts are then submitted to solution annealing in a vacuum furnace on a stainless steel cylinder, where the layered belts are rotated around two pulleys with tension in order to adjust the gap between the belts. After the dimensional correction, the layered belts are processed by precipitation-hardening (e.g., 490° C. for 3 hours) and surface-nitriding. Finally, in order to improve lubrication ability between belts, surface profiling is performed. Such surface treatment may include grinding, rolling, knurling, peening, etching, abrading, conventional grinding, electrochemical grinding and selectively heating or selectively annealing specific portions of the belt.

U.S. Pat. No. 4,787,961 to Rush discloses a method of preparing multilayered endless metal belts, wherein tensile band sets are formed from a plurality of separate looped endless bands in a nested and superimposed relation. The patent states that the bands are free to move relative to each other, even though the spacing between the adjacent bands is relatively small. Such bands may be formed by an electroforming process.

When endless metal belt assemblies are used with continuously-variable transmissions, they experience frictional stress between belts, because in most applications the outside belt moves progressively faster than the next successive inside belt. Therefore, it is desirable to reduce the friction between the belts.

SUMMARY OF THE INVENTION

It is an object of the invention to provide an endless metal belt assembly wherein frictional stress between each pair of adjacent belts is reduced.

It is another object of the invention to provide a process of forming an endless metal belt assembly wherein the belt surfaces are configured to maintain lubrication of the belt assembly.

These and other objects are achieved by the present invention which provides an endless metal belt assembly with belt surfaces configured with indentations, protuberances and/or pits in such a manner that the adjacent opposing surfaces of each belt have substantially uniform but non-mating configurations of indentations, protuberances and/or pits in order to trap, circulate and carry a lubricant.

DETAILED DESCRIPTION OF PREFERRED EMBODIMENTS

Figure 1A:
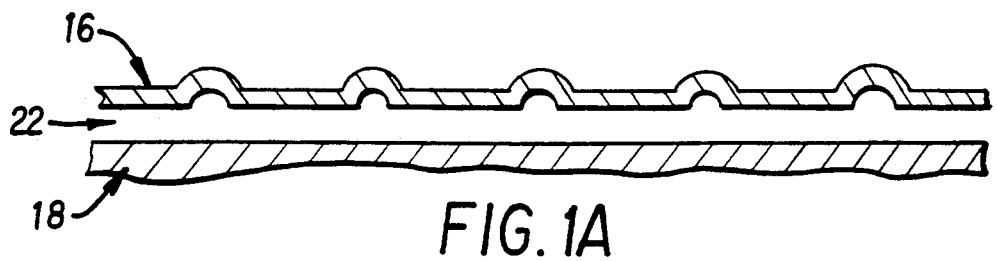
FIGS. 1A–1E are cross-sections of different surfaces and combinations of adjacent surfaces.

This invention provides an electroformed endless metal belt assembly with surfaces which have been formed with protuberances, indentations and/or pits in order to trap, circulate and carry a lubricant, and thus minimize contact between adjacent belt surfaces by providing enhanced lubricant circulation.

According to the invention, an endless metal belt assembly is comprised of a nest of belts of thin, flexible metal. Such a belt assembly can, for example, be used as a drive member for a continuously-variable transmission.

A continuously-variable transmission belt assembly ideally has a nest of 3 to 40 or more belts, designed in such a way that each belt has an outside diameter which is slightly less than the inside diameter of the next larger belt in the nest. This design permits the belts to share the load. However, such a belt is exposed to a large number of stresses and is subject to wear from the large amount of friction to which the belt is exposed as each belt moves relative to adjacent belts during the operation of the continuously-variable transmission.

When belts are electroformed, the belt edges may be strengthened so that the ductility of the edge regions of the belt is made greater than that of the center region, for instance by annealing the edges, as disclosed in detail in copending application Ser. No. 633,027, filed simultaneously herewith and entitled "Endless Metal Belt with Strengthened Edges," which is hereby incorporated by reference.

According to this invention, adjacent opposing surfaces of the belts of the nested endless metal belt assembly may be provided with a substantially uniformly distributed plurality of indentations, a substantially uniformly distributed plurality of protuberances, and/or a randomly distributed plurality of pits. Each set of such opposing surfaces is comprised of a surface of one belt facing a non-mating surface of an adjacent belt. This configuration is advantageous for the purpose of holding and circulating a lubricant such as oil. A preferred lubricant is transmission oil. Ideally, the endless metal belt assembly is comprised of flexible, thin metal belts, ranging in thickness from about 0.0432 to 0.0451 mm.

An endless metal belt assembly according to this invention can be produced in a manner known in the art, modified to provide the desired surface configurations. However, a highly advantageous method for the preparation of such a belt assembly is by an electroforming process, which may be similar to that disclosed in U.S. Pat. No. 3,844,906 and U.S. Pat. No. 4,501,646. This process provides an electroforming bath formulated to produce a thin, seamless metal belt by electrolytically depositing metal from the bath onto a support mandrel. Electroformed belts may be formed individually, or in a superimposed manner, to form a "nested" belt assembly. When addressed as an assembly, each belt within the assembly is separated from the adjacent belt or belts by a gap which contains a lubricant. An advantage of the electroforming process, which is the preferred method for this invention, is that it enables very thin belts to be formed in a manner that controls the gap size optimally.

The optimal thickness of the belt material is identified by determining the belt thickness associated with the lowest total stress (bending stress plus direct stress) on the belt in a given dual pulley system. The total stress is equal to the sum of the bending stress plus the direct stress. Bending stress is equal to $EC/\rho$, wherein E is the elasticity of the belt material, C is one half the belt thickness, and $\rho$ is the radius of curvature of the smallest pulley. Direct stress is equal to $F_1 A$, wherein $F_1$ is the tight side force between the pulleys and A is the cross-sectional area of the belt. The total stress is calculated for a series of belts of different thicknesses, and the belts are formed with the thickness which has the lowest total stress value.

The optimal gap size is the minimum gap necessary to provide adequate lubrication, since a smaller gap allows the lubricant to carry more torque than does a larger gap. This size can readily be determined by one of ordinary skill in the art. The optimal lubricant is identified by determining the lubricant with the lightest torque-carrying ability within its optimal gap. The torque carrying ability of a given lubricant is equal to $$T = 4\mu\pi^2 N r^3 l / M_r$$

wherein $\mu$ is the absolute viscosity of the lubricant, N is the rotational velocity of the smallest pulley, r is the radius of the smallest pulley, l is the width of the belt and $M_r$ is the radial clearance (gap) between adjacent belts. The torque carrying ability is calculated for a series of different lubricants and a lubricant is selected which provides the highest value. The methods of determining optimal belt thickness and lubricant are disclosed in detail in copending application Ser. No. 07/632,591, now U.S. Pat. No. 5,049,242 entitled "Endless Metal Belt Assembly with Controlled Parameters," which is hereby incorporated by reference.

Figure 1B:
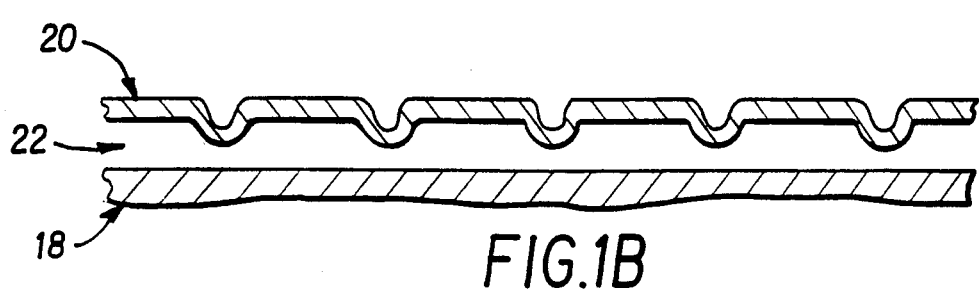
Figure 1C:
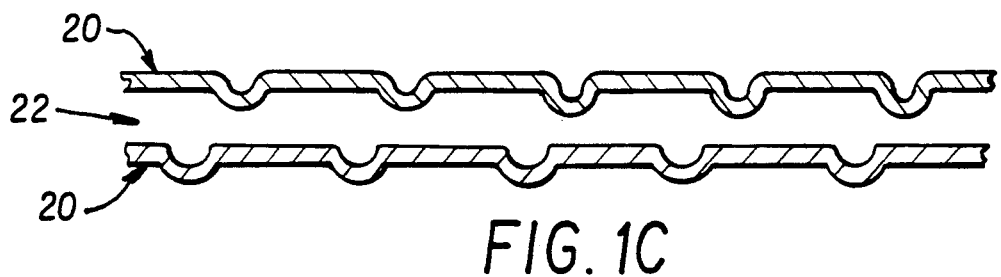
Figure 1D:
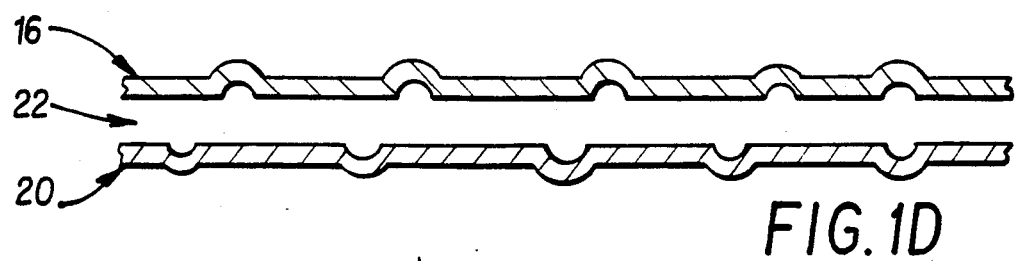
Figure 1E:
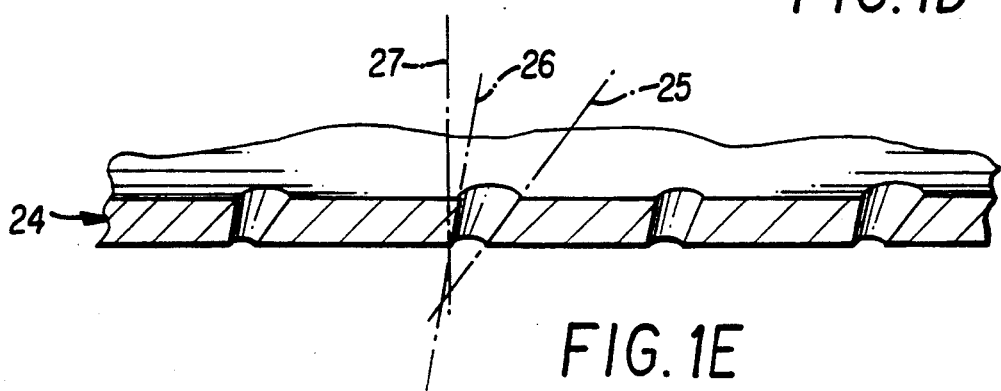

The belts prepared according to this invention contain surfaces as exemplified in FIGS. 1A-1E. These figures show some of the possible combinations of adjacent surfaces which may contain protuberances, indentations or pits, with a gap 22 between each set of adjacent surfaces. For example, in FIG. 1A, on adjacent surfaces of belts 16 and 18, belt 16 contains indentations and belt 18 is comprised of a smooth, or otherwise unspecified surface. In FIG. 1B, on adjacent surfaces of belts 18 and 20, belt 20 contains protuberances and belt 18 contains a smooth or otherwise unspecified surface. In FIG. 1C, on adjacent surfaces, belt 20 with protuberances faces an adjacent belt 20 with indentations. In FIG. 1D, on adjacent surfaces of belts 16 and 20, both belt 16 and belt 20 contain indentations. In FIG. 1E, pits are shown on a cross-section of a pitted belt, illustrating the characteristic tornado-shape of the pit which is open at both ends. The pitted belt of FIG. 1E may be configured to be adjacent to belts with indentations or protuberances, or may additionally contain such indentations or protuberances. FIGS. 1A-1E only illustrate a limited number of configurations of belts. These same configurations or any combination of configurations could exist for a series of 2-40 or more belts.

When the belts of this invention are formed by an electroforming process, indentations are not formed on the bath side of a deposited belt. Therefore, to electroform any of the above belts wherein protuberances are facing indentations, the belts must be prepared separately, for example, using internal and external mandrels or reversing belts after they are formed, and then be superimposed.

Figure 2:
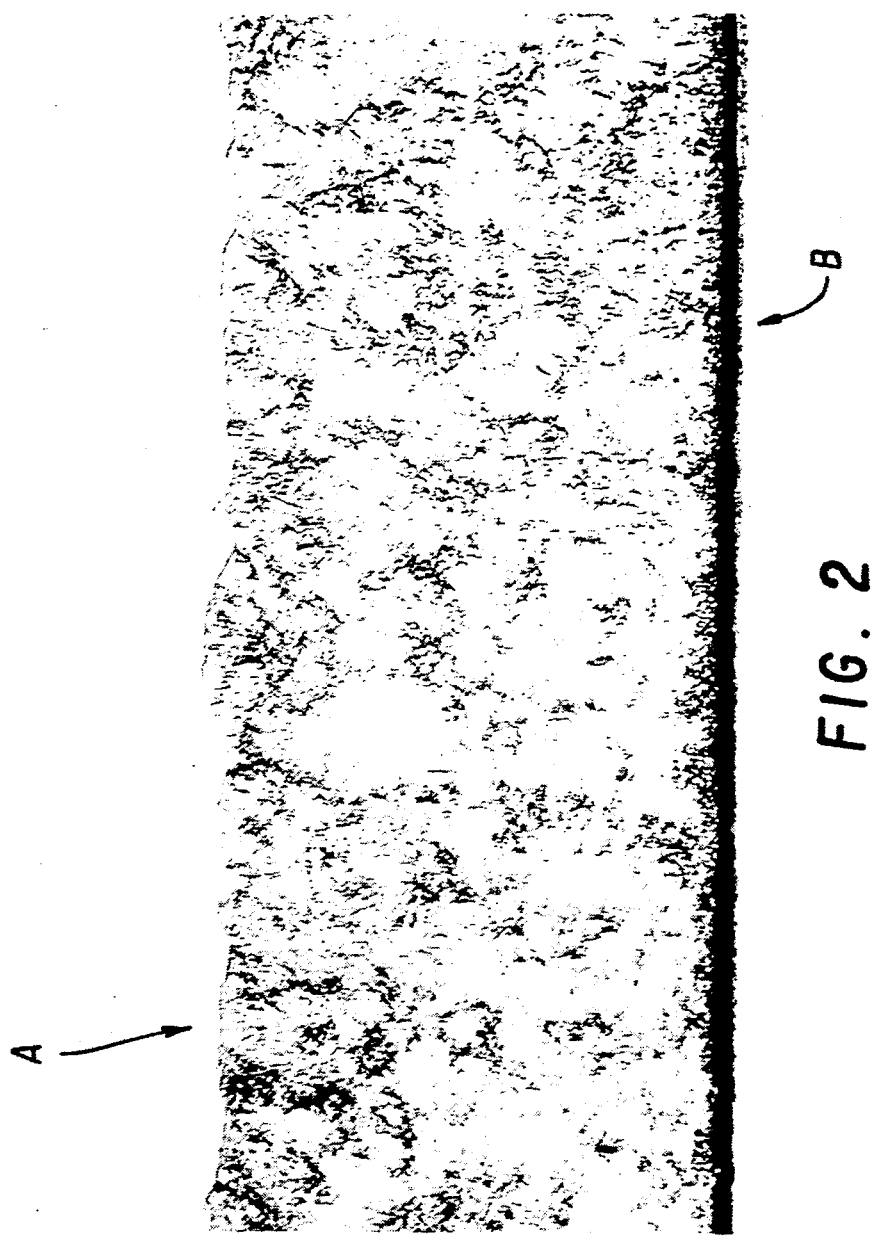
FIG. 2 shows a cross section of an electroformed nickel deposit.

Protuberances which may be made by the electroforming process are generally oval to spherical sections which protrude from the bath side of the deposit outward to a distance (height) which is generally less than one quarter of the exposed diameter. This height is often about one tenth of the diameter. FIG. 2 (drawn approximately to scale) depicts a cross-section of an electroformed nickel belt wherein the roughness of the bath side A is approximately 35 $\mu$ inch and the roughness of the mandrel side B is about 1 μ inch, showing typical protuberance formation.

The shape of electroformed indentations is opposite to the shape of electroformed protuberances. The indentations are generally hollow oval to spherical sections which intrude from the mandrel side of the deposit inward to a distance (depth) which is generally less than one quarter of the exposed diameter. This depth is often about one tenth of the diameter.

The shape of a pit can best be described as tornado shaped with a slant down wind. The slant in this case is away from the direction of rotation of the mandrel. Generally, the pits (gas pits) are formed from hydrogen gas in the following manner. When a small gas bubble forms on the surface of the mandrel (or the outside of the previous belt), at first the bubble is too small to be impacted by rotation of the mandrel because it is totally within the diffusion layer of the electrolyte which is closest to the mandrel and which has no relative motion compared to the mandrel. The gas bubble is, however, big enough to shield the mandrel so that no metal can be deposited where the gas bubble has formed. As the bubble increases in size, but before it is large enough to be swept away, it will begin to skew because of the effect of rotating the mandrel. While in this increasingly skewed condition, the bubble will mask (i.e., prevent deposition on) a larger area, and that area will increase in a disproportionate manner away from the direction of rotation. After the bubble is finally big enough to be swept away, the masked area is reduced to that of a newly forming bubble, and the formerly masked area is then free to accept additional metal deposit.

As the deposit gets thicker, the time interval needed to generate sufficient gas to fill the resulting tunnel gets longer. Thus, there is no masking at the surface, which results in the growth of metal around the hole which produces a restriction in the diameter of the tunnel. The surface defect, however, remains about the same size and shape throughout this process but continues to move away from the direction of rotation as the deposit thickness increases, producing the tornado-shaped slant described above.

A pitted belt may not make a suitable surface for the electroforming of subsequent belts as the new deposit may plate down into the pits, resulting in unacceptable keying of the belts during operation of the CVT. This keying problem can be minimized by keeping the belt wet during the electroforming process used to form the belts to improve the chances of continued gassing from the pits. Alternatively, the belts may be formed separately and later superimposed.

The dimensions of the protuberances and indentations vary considerably over a broad range measured from peak to valley. The diameters of all protuberances are from 3 to 15 times their height. The size of a gas ($H_2$) pit on the bath side of the deposit is determined by how big the bubble becomes before it is dislodged. Many interacting factors impact on how big this bubble can become, including thickness of the diffusion layer, current density, mandrel rotation speed, density of the bath, etc. The larger the bubble, the more tear-shaped the pit becomes on the surface of the mandrel. It is possible to form tear-shaped pits of about 0.00001 inch in width and about 0.1 inch in length. For the CVT belt, the pits should be about 0.0005 inch in width and about 0.002 inch in length.

The maximum dimension of the pits at the mandrel surface is quite uniform for all cases seen. The shape, however is not. It is angular, of a polygon shape with three or more unequal length sides (up to twenty) which join at angles which often alternate as obtuse and acute. The length from furthest point to furthest point of these polygons is on the order of 0.00005 inches.

The dimensions of the tube through the belt are quite uniform for any given conditions. The tube tapers (much like a tornado), getting smaller and smaller toward the mandrel end. The tube also has periodic restrictions, described previously, which get more and more robust as the deposit thickens.

The distribution of protuberances and indentations is continuous, and appears to be overlapping at their edges; in some cases they appear to be growing out of underlying protuberances, or indentations, respectively. The size distribution, though it may appear to be random, is more likely an even distribution. Despite the fact that the same mandrel may be employed to form successive belts to be used in the same nest of belts, the indentations and protuberances of a belt will always be in a slightly different arrangement than that of the adjacent belts, because each belt is produced to be of slightly different circumferential length. Thus, the indentations and protuberances will never be able to completely align, and the spaces provided between the adjacent belts will always be present to hold and carry the lubricant during the operation of the device.

Pits are distributed in a manner wherein their density may range from zero per square foot to tens of thousands per square inch. They will all have the same characteristic dimensions on an otherwise smooth belt. The dimensions of the pits are impacted by rougher deposits; thus, rougher deposits will show more variability in dimension. The distribution is totally random which, in reality, looks somewhat clustered with large oddly shaped expanses with noticeably fewer pits.

Pits do not intrude into the lubricating medium, thus the limiting factor is the amount that they subtract from the strength of the member. They generally constitute less than around 20%, preferably about 1%, and most preferably between 0.001% and 0.01% of the cross sectional area. This would allow for good lubricant flow while minimizing the impact on load carrying capacity.

The surfaces of electroformed metal deposits such as nickel deposits obtained from electrolytes which have not been specifically formulated and electroformed under specific conditions to produce smooth deposits will be rough. This roughness is the result of the bath side of the deposit having a surface which is covered with nodules. These nodules are for the most part spherical segments with heights that are typically four to ten times smaller than their diameters. Larger nodules may be present with heights which are at least half their diameters to many times their diameters. While it is important to limit the number and size of these larger nodules, they are not the object of this invention. The appearance of the metal surface is not necessarily indicative of the presence or absence of individual larger nodules. A metal deposit can be bright (e.g., shiny) and rough, bright and smooth, smooth and dull (mat finish), or rough and dull. Smooth deposits (which may or may not be bright) are normally obtained by using levelers. Bright deposits are normally obtained by using brighteners.

Some commonly used levelers include 2-butyne-1,4-diol, thiourea, and coumarin. Some commonly used brighteners include aryl sulphonic acids, sulphinic acids, suphonimides, and suphonamides.

Surface roughness may be measured by using a surface indicator having a stylus which is constructed to contact the surface being measured and then to move across that surface while contact is maintained. Any minute movement of the stylus in the vertical direction is recorded in a manner which greatly exaggerates the up and down movement. An appropriate instrument for making surface roughness measurements is a BRUSH® SURFINDICATOR MODEL MS - 1000=01 with a MODEL BL - 117A MOTOR DRIVE. These devices are manufactured by Clevite Corporation, Gaging and Control Division located at 4601 North Arden Drive, El Monte, California 91731.

The differences between the peaks and the valleys and a center line are averaged to get a numerical evaluation of roughness. Two methods of averaging are most commonly used: Root Mean Squared average (RMS) and Arithmetic Average (AA). The measurements are normally expressed in micro inches ($\mu$in) in AA or RMS.

Arithmetic Average or AA roughness is the arithmetic average of the absolute deviation from the center line divided by the sampling length:

$$AA = 1/L \int_{from\ x=0}^{to\ x=L} |y|dx$$

where:
y = ordinate of the curve of the profile, and
L = the sampling length.

Root Mean Squared or RMS roughness is determined by taking the square root of the sum of the squares of the deviation from the center line divided by the number of measurements made:

$$RMS = (X_1 - X_M)^2 + (X_2 - X_M)^2 + \ldots (X_N - X_M)^2/N$$

$$N = L/\Delta X$$

where:
$\Delta X$ = length of the sample segment,
L = the sampling length,
N = the number of samples (measurements),
$X_N$ = the Nth measurement, and
$X_M$ = the center line.

Each pair of adjacent belts has a gap between the surfaces filled with lubricant. The size of this gap may vary over a broad range, impacting the selection of the geometry of adjacent surfaces according to the present invention. For example, a 0.0004 inch gap is preferably associated with a surface with a RMS value between about 3 and about 40 $\mu$ inch. Keying will occur above 40 $\mu$ inch RMS. For such a gap, the RMS value is preferably selected to be between about 3 and about 20 $\mu$ inch RMS, more preferably between about 3 and about 10 $\mu$ inch RMS. At 10 $\mu$ inch RMS the maximum peak to valley distance is near 0.000040 inches or 10% of the gap. At 3 $\mu$ inch RMS the maximum peak to valley distance is near 0.000008 inches, but 50% of the peak to valley distances are about 0.000004 inches or about 1% of the gap.

The protuberance height (peak to valley) varies considerably at any RMS value. The maximum peak to valley distance of the protuberances should be no more than about 95% of the gap size; preferably less than 50%; more preferably, less than 10%; and most preferably, less than 1%. At 35 $\mu$ inch RMS, for example, the peak to center line distance averages 0.000035 inches and the peak to valley distance averages 0.000070 inches. The actual maximum peak to valley distance can be as much as about 0.000315 inches, approximately ten times the RMS.

Figure 3:
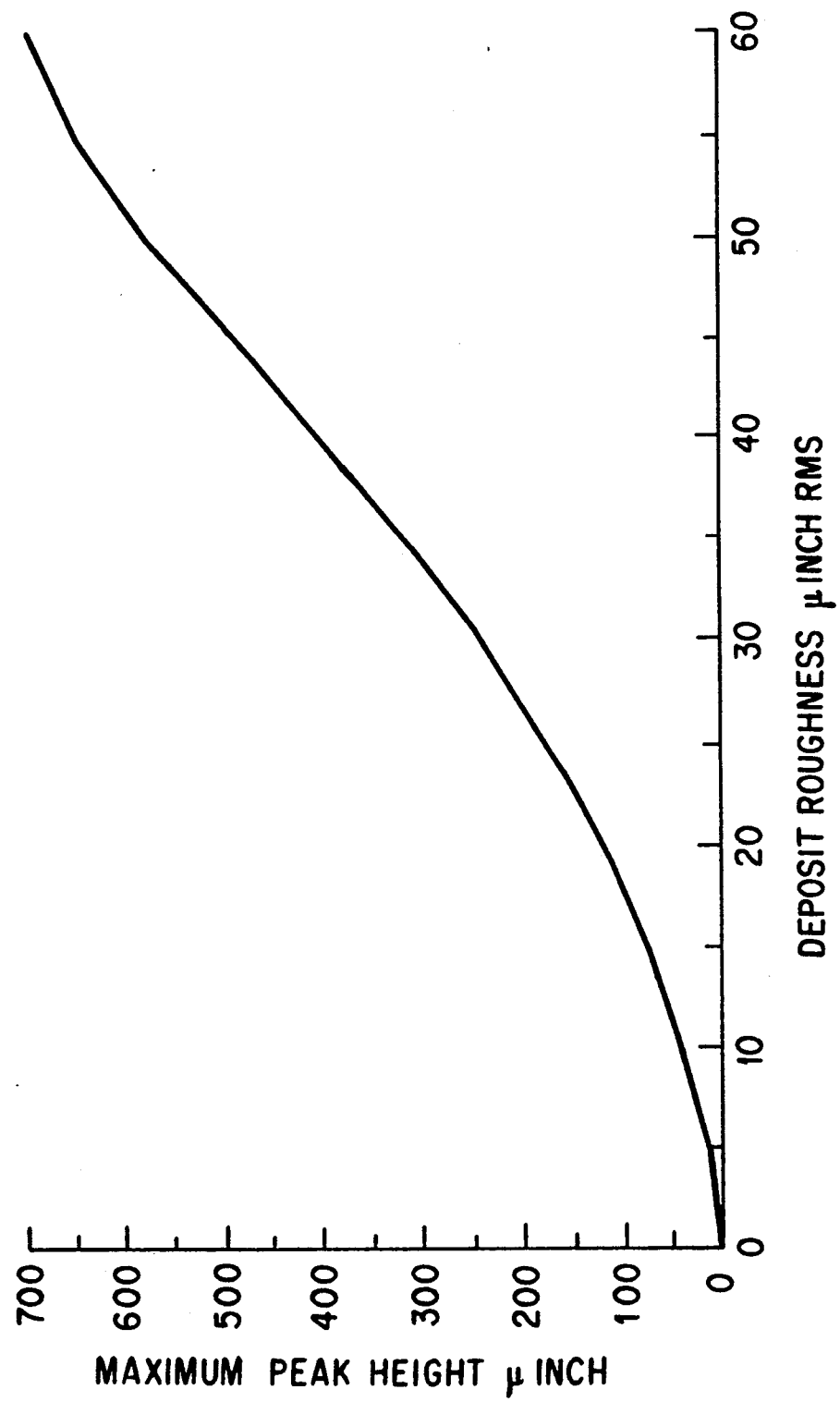
FIG. 3 shows the relationship between RMS values and maximum peak to valley distances.

FIG. 3 shows the relationship between RMS values and maximum peak to valley distance. About 0.07% of the protuberances approach this maximum at any given RMS value. The rest of the protuberances have heights which diminish to zero with the majority having heights within 10% of twice the RMS value. The diameters of all protuberances are from 3 to 15 times their height.

As shown in the examples, the roughness of the surface can be changed by adjusting the bath chemistry and operating parameters to provide surface roughness (protuberances and/or indentations) within a specific range. The same bath will produce deposits of differing roughness at the same thickness depending on what is causing the roughness and how that material is getting to the cathode. For example, if the roughness is being caused by nickel sulfide particles which move through the cathode diffusion layer via diffusion, then any change in particle concentration or operating parameters which reduces the thickness of the cathode diffusion layer or speeds up the diffusion process will cause the deposit to have a higher RMS value. Additional factors can also impact the roughness of the deposit. These factors include the age of the system, the deposit thickness, the concentration of metal in the electrolyte, the rate of current application (ramp rise), the current density, the operating temperature of the electrolyte, and the type of anode used. Other factors include the pH, the surface tension of the electrolyte solution, the concentrations of the metal ions (e.g., $Ni^{+2}$), the concentrations of buffering agents (e.g., boric acid), the concentration of anode polarization avoidants (e.g., halogen ions), the concentrations of other additives, such as additives included for stress reduction (e.g., saccharin, MBSA), the length of time of operating the apparatus, the degree of agitation of the electroforming bath, the cell geometry, and the distance of the anodes from the mandrel.

Figure 4:
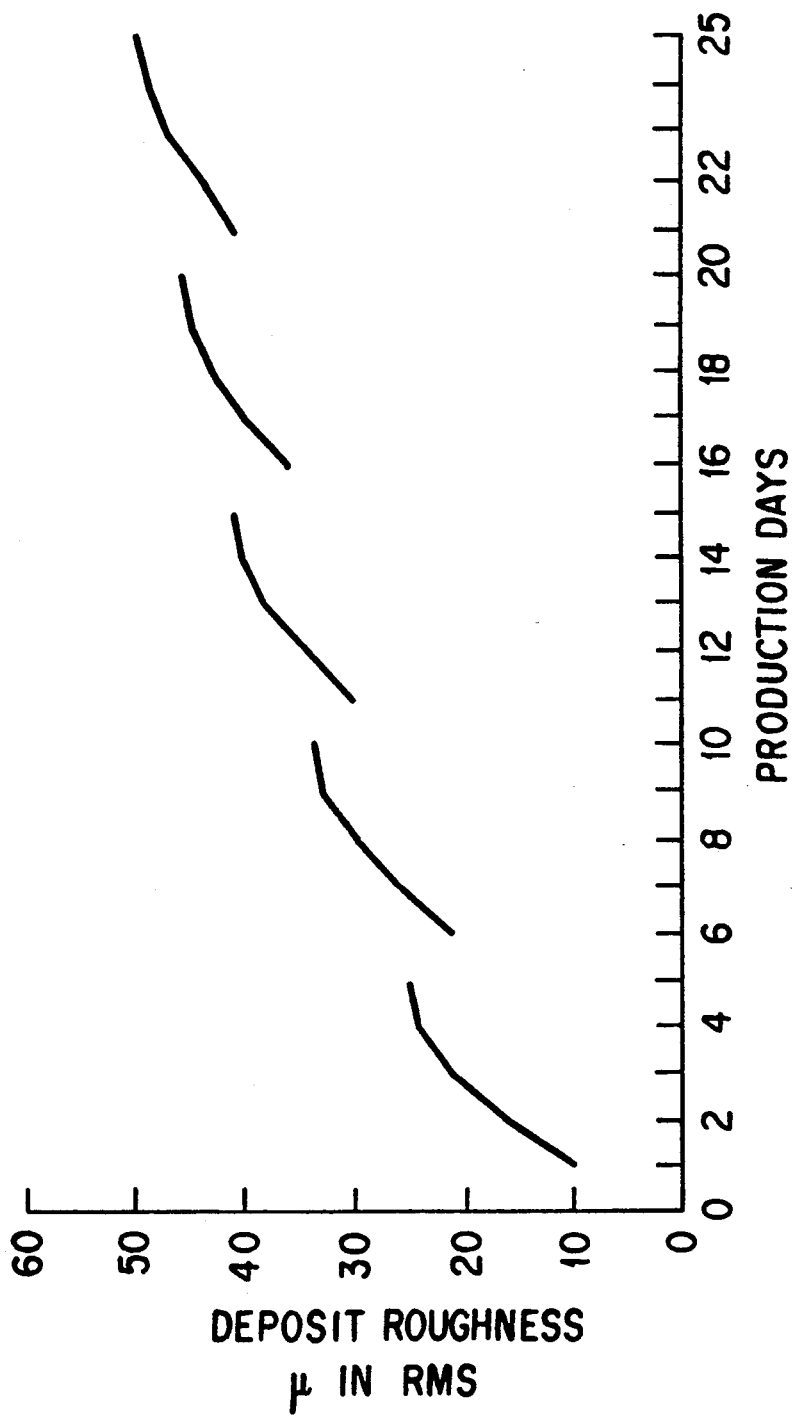
FIG. 4 shows how surface roughness increases over time for a given electroforming bath.

A system will often produce a rougher (higher RMS value) deposit as that system ages. For example, the first deposits of the day will often be rougher (higher RMS value) than subsequent deposits. However, deposits produced on the last day of a production period (e.g., Friday) will have a higher average RMS value than the deposits made on the first day of the production period (e.g., Monday). While the deposits made on the first day of the second production period will be smoother, on average, than the deposits made on the last day of the previous production period, they will not be smoother or as smooth as the deposits made on the first day of the previous production period. FIG. 4 shows how the surface roughness can increase day to day and week to week. Consequently, the RMS value of the deposits will continue to increase until the electrolyte is renewed (i.e., treated to remove the roughness causing constituents). Carbon treatment has been found to be effective in returning a nickel bath to a condition which will allow the production of smoother deposits.

The operating parameters used to create the results of FIG. 4 are given below.
Major Electrolyte Constituents Nickel Sulfamate—as $Ni^{+2}$, 13.5 oz/gal. (101.25 g/L)
Chloride—as $NiCl_2 \cdot 6H_2O$, 2 oz/gal. (15 g/L)
Boric acid—5 oz/gal. (37.5 g/L)
pH—3 95-4.05 at 23° C.
Surface Tension—at 136° F., 32-37 d/cm using sodium lauryl sulfate (about 0.00525 g/L).
Saccharin—25-30 mg/L, as sodium benzosulfimide dihydrate.
Impurities
Azodisulfonate—5-10 mg/L.
Copper—5 mg/L.
Iron—25 mg/L.
MBSA—(2-methyl benzene sulfonamide)—5-10 mg/L.
Sodium—0.1 g/L.
Sulfate—0.5 g/L.
Operating Parameters
Agitation Rate—5 linear ft/sec solution flow over the cathode surface.
Cathode (Mandrel)—Current density, 225 ASF (amps per square foot).
Ramp Rise—0 to operating amps in 2 sec. ±1 sec.
Anode—Sulfur depolarized nickel.
Anode to Cathode Ratio—1.2:1.
Mandrel—Chromium plated Aluminum—8 to 15 $\mu$ inch RMS.
Deposit Thickness—0.0045 inches +/−0.0005 inches (0.1143 mm +/−0.0127 mm).
Load—50 amp hours per liter per day.
Temperature—60° C.

Figure 5:
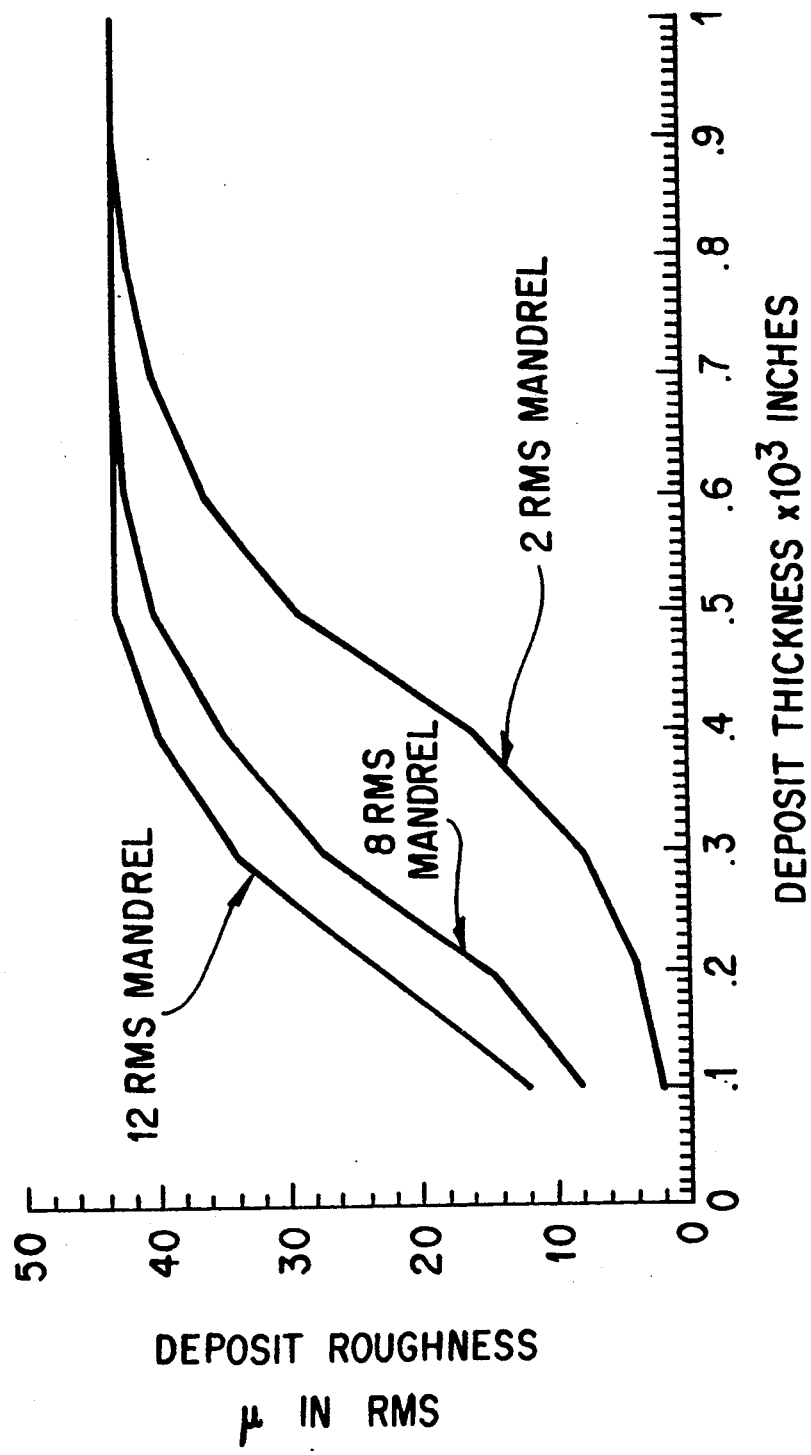
FIG. 5 shows the impact of the mandrel on the roughness of the bath side of a deposit as the deposit thickness increases.

The initial deposit will have a bath side surface which is impacted by the surface finish of the underlying surface (e.g., the mandrel surface). Initially, a belt produced by an electroforming process replicates the surface of the mandrel on the bath side of the belt with the inverse arrangement of indentations and protuberances on the mandrel side of the belt. When such a mandrel is "tank-finished", i.e., not polished to a smooth surface before being used as a core mandrel, it will contain all of the imperfections from the process which was employed to form the core mandrel. The impact of the underlying surface on the bath side surface of the deposit diminishes as the deposit thickness increases. A bath which is not specifically formulated to produce a smooth deposit will often produce a deposit which becomes rougher (higher RMS) as the thickness of the deposit increases. FIG. 5 shows how the surface of the mandrel impacts the bath side of the deposit as the deposit thickness increases in a system having the following operating parameters:
Major Electrolyte Constituents
Nickel Sulfamate—as $Ni^{+2}$, 13.5 oz/gal. (101.25 g/L)
Chloride—as $NiCl_2 \cdot 6H_2O$, 2 oz/gal. (15 g/L)
Boric acid—5 oz/gal. (37.5 g/L)
pH—3.95-4.05 at 23° C.
—Surface Tension—at 136° F., 32-37 d/cm using sodium lauryl sulfate (about 0.00525 g/L).
Saccharin—25-30 mg/L, as sodium benzosulfimide dihydrate.
Impurities
Azodisulfonate—5-10 mg/L.
Copper—5 mg/L.
Iron—25 mg/L.
MBSA—(2-methyl benzene sulfonamide)—5-10 mg/L.
Sodium—0.1 g/L.
Sulfate—0.5 g/L.
Operating Parameters
Agitation Rate—5 linear ft/sec solution flow over the cathode surface.
Cathode (Mandrel)—Current density, 225 ASF (amps per square foot).
Ramp Rise—0 to operating amps in 2 sec. ±1 sec.
Anode—Sulfur depolarized nickel.
Anode to Cathode Ratio—1.2:1.
Mandrel—Chromium plated Aluminum—2, 8 & 12 $\mu$ inch RMS.
Temperature—60° C.

Three mandrels were used. One mandrel has a 2 $\mu$ inch RMS finish, one has an 8 $\mu$ inch RMS finish, and one has a 12 $\mu$ inch RMS finish. The deposits have about the same finish as the mandrel until a deposit in excess of 0.0001 inches (0.00254 mm) thickness is obtained. By the time a thickness of 0.0009 inches (0.02286 mm) is obtained, all of the deposits have the same surface finish independent of the mandrel surface finish. The opposite is also true. That is, if the electrolyte used is producing a deposit which is smoother than the mandrel, the deposit will quickly become smoother than the mandrel.

The surface roughness increases at a rate of about 2 $\mu$ inch RMS for each additional 0.005 inches of deposit for all three examples above.

Figure 6:
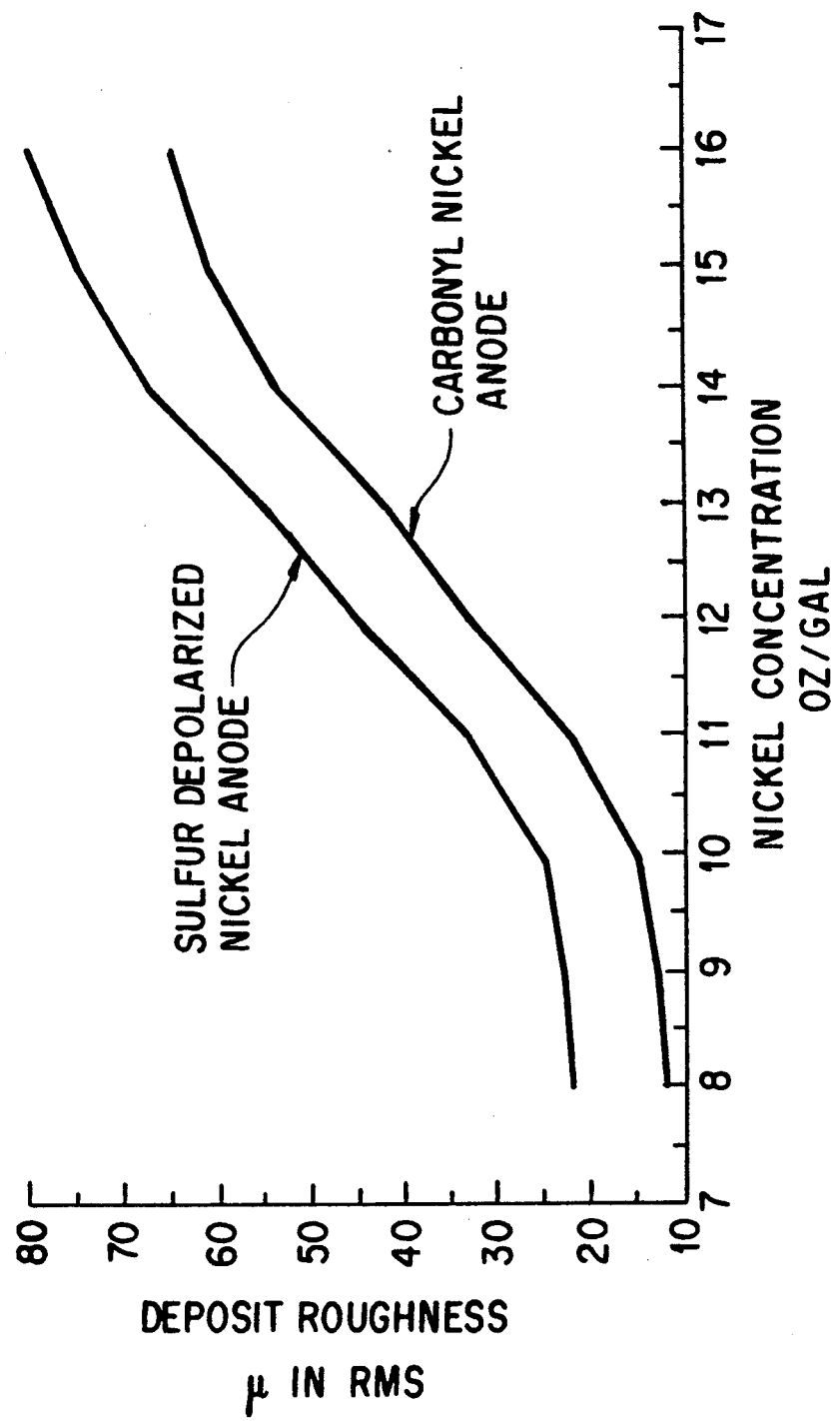
FIG. 6 shows the impact of the concentration of nickel in an electroforming bath on deposit roughness.

The concentration of metal ions such as nickel ions in the electrolyte can also affect the roughness of the electroformed surface. The effect of increasing the electrolyte concentration on surface roughness for a system having the following operating parameters is shown in FIG. 6:
Major Electrolyte Constituents
Nickel Sulfamate—as $Ni^{+2}$, 8-16 oz/gal. (60-120 g/L)
Chloride—as $NiCl_2 \cdot 6H_2O$, 2 oz/gal. (15 g/L)
Boric acid—5 oz/gal. (37.5 g/L)
pH—3.95-4.05 at 23° C.
Surface Tension—at 136° F., 32-37 d/cm using sodium lauryl sulfate (about 0.00525 g/L).
Saccharin—25-30 mg/L, as sodium benzosulfimide dihydrate.
Impurities
Azodisulfonate—5-10 mg/L.
Copper—5 mg/L.
Iron—25 mg/L.
MBSA—(2-methyl benzene sulfonamide)—5-10 mg/L.
Sodium—0.1 g/L.
Sulfate—0.5 g/L.
Operating Parameters
Agitation Rate—5 linear ft/sec solution flow over the cathode surface.
Cathode (Mandrel)—Current density, 225 ASF (amps per square foot).
Ramp Rise—0 to operating amps in 2 sec. ±1 sec.
Anode—Sulfur depolarized nickel and carbonyl nickel.
Anode to Cathode Ratio—1.2:1.
Deposit Thickness—0.0045 inches.
Mandrel—Chromium plated Aluminum—8 to 15 $\mu$ inch RMS.
Temperature—62° C.

Two types of anode material are used and behave similarly, except for a marked downward (smoother) shift using the carbonyl nickel anode material. The use of non-depolarized anodes like electrolytic anodes and carbonyl anodes will cause the deposit to have less surface roughness than deposits made with sulfur depolarized (SD) anodes. It is believed that the sulfur depolarized anodes are a source for nickel sulfide which is known to increase the surface roughness of a nickel deposit when it is present in the electrolyte as insoluble particulate matter. However, this material is problematic because it can be gelatinous, and thus will often extrude through filters.

Why nickel concentration has this impact on deposit roughness is not well understood. However, it is likely that thicker baths (e.g., electrolytes with higher metal ion concentrations) can suspend larger quantities of particulate of the type which contributes to deposit roughness. The use of this parameter to control or change the surface finish of a deposit is not advantageous, but one must be aware of this effect when trying to obtain uniform surface finishes on electrodeposits. Lower concentrations of metal (e.g., 8 to 10 oz/gal of nickel sulfamate) are recommended as the surface finish change is small for relatively large changes in metal concentrations and low concentration baths are less expensive to prepare.

Selection of the current application ramp is a preferred method of controlling the deposit surface finish. Increased ramp time will produce a smoother surface. Ramp time can be controlled very accurately and is amenable to automation. Consequently, the time used to come to full current (ramp) is often used to compensate for surface roughness increases associated with temperature increases which are used to obtain increased internal compressive stress so that a desired gap between belts can be obtained. Ramp current application can also be used to compensate for changes in deposit surface finish resulting from electrolyte aging.

Figure 7:
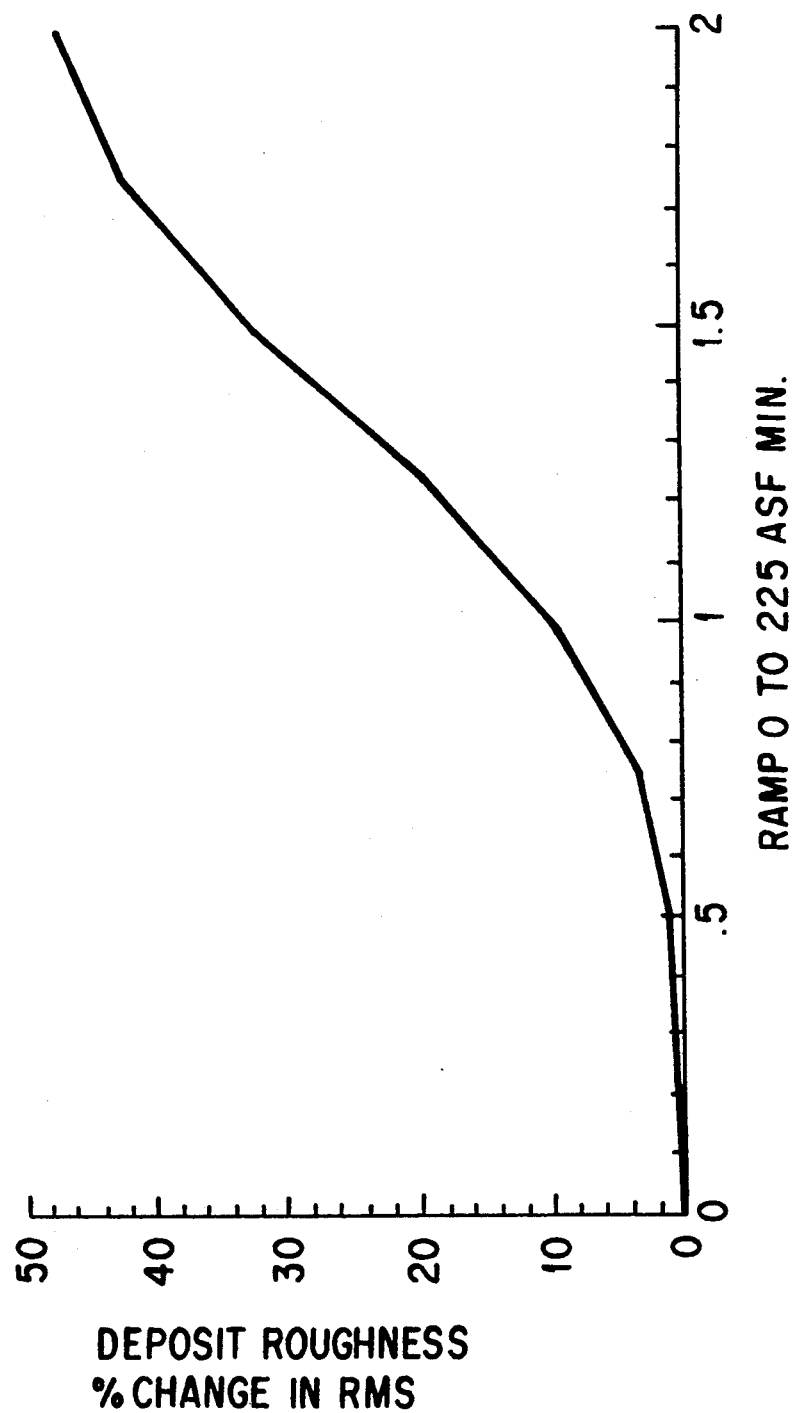
FIG. 7 shows the impact of the rate of current application on the deposit roughness.

The effect of ramp time on surface roughness for a system with the following operating parameters is shown in FIG. 7 (% change in RMS refers to decrease in RMS):

Major Electrolyte Constituents
Nickel Sulfamate—as $Ni^{+2}$, 13 oz/gal. (97.5 g/L)
Chloride—as $NiCl_2 \cdot 6H_2O$, 2 oz/gal. (15 g/L)
Boric acid—5 oz/gal. (37.5 g/L)
pH—3.95-4.05 at 23° C.
Surface Tension—at 136° F., 32-37 d/cm using sodium lauryl sulfate (about 0.00525 g/L).
Saccharin—25-30 mg/L, as sodium benzosulfimide dihydrate.
Impurities
Azodisulfonate—5-10 mg/L.
Copper—5 mg/L.
Iron—25 mg/L.
MBSA—(2-methyl benzene sulfonamide)—5-10 mg/L.
Sodium—0.1 g/L.
Sulfate—0.5 g/L.
Operating Parameters
Agitation Rate—5 l linear ft/sec solution flow over the cathode surface.
Cathode (Mandrel)—Current density, 225 ASF (amps per square foot).
Ramp Rise—0 to operating amps in 2 sec. ±1 sec to 2 min ±2 sec.
Anode—Sulfur depolarized nickel and carbonyl nickel.
Anode to Cathode Ratio—1.2:1.
Deposit Thickness—0.0045 inches.
Mandrel—Chromium plated Aluminum—8 to 15 μ inch RMS.
Temperature—62° C.

The impact of ramp current application appears to be independent of anode type as the above results can be repeated using both SD and carbonyl nickel anodes. The effect is not independent of metal concentration, however, because a one minute ramp produces no change in surface roughness using a 16 oz/gal nickel sulfamate electrolyte but produces a 15% reduction in expected surface roughness at 11.5 oz/gal and a 17.5% reduction in surface roughness at 10 oz/gal. FIG. 7 shows a 10% reduction at 13 oz/gal.

Figure 8:
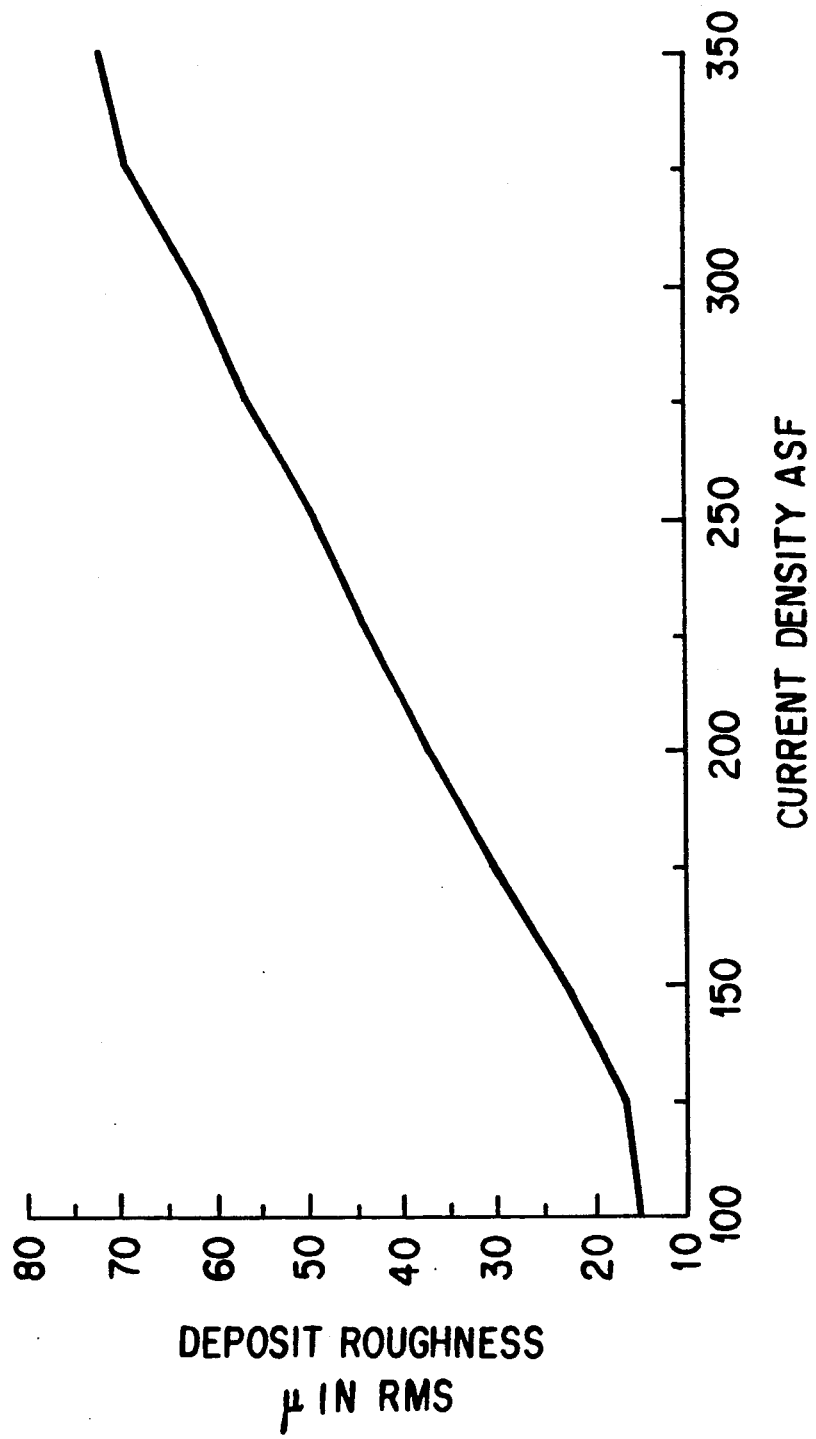
FIG. 8 shows the impact of current density on the deposit roughness.

As shown in FIG. 8, there is a nearly linear relationship between current density and surface finish. This relationship makes this parameter easy to use for controlling surface roughness. This advantage is somewhat neutralized by the increase in deposition time required at lower current densities. Consequently, though being easy to use and compatible with automation and programming, current density is often kept as high as possible to maximize deposition rate.

The relationship between current density and deposit internal stress of a deposit is important to this invention. If the current density is reduced to lower the surface roughness, the deposit will also have a higher internal compressive stress when the electrolyte contains diffusion controlled constituents that impact compressive stress. The gap which is formed between adjacent layers may be controlled by selecting those parameters which produce a compressive stress which will produce the desired gap, such as electroforming bath temperature, current density, agitation and stress reducer concentration, as disclosed in detail in copending application Ser. No. 07/632,518, filed simultaneously herewith and entitled "Electroforming Process for Endless Metal Belt Assembly with Belts that are Increasingly Compressively Stressed," which is hereby incorporated by reference.

Decreasing current density can be used to produce individual deposits with increasing internal compressive stress to obtain and control belt-to-belt gap, but the opposing belt surfaces will become smoother as one progresses from one belt to the next. This decrease in roughness can be compensated for by decreasing the time used to come to full current (ramp).

Generally, the current densities range from about 150 amps/sq ft to about 500 amps/sq ft, with a preferred current density of about 225 amps/sq ft. Generally, current concentrations range from about 5 to about 20 amps per gallon. Higher current densities may be achieved by increasing the electrolyte flow, mandrel rotational speed, electrolyte agitation, and cooling. However, as shown in FIG. 8, very high current densities employed with a nickel sulfamate electroforming solution must be handled carefully to achieve the desired surface.

The system which produces the specific results shown in FIG. 8 has the following operating parameters:

Major Electrolyte Constituents
Nickel Sulfamate—as $Ni^{+2}$, 13.5 oz/gal. (101.25 g/L)
Chloride—as $NiCl_2 19$ $6H_2O$, 2 oz/gal. (15 g/L)
Boric acid—5 oz/gal. (37.5 g/L)
pH—3.95-4.05 at 23° C.
Surface Tension—at 136° F., 32-37 d/cm using sodium lauryl sulfate (about 0.00525 g/L).
Saccharin—25-30 mg/L, as sodium benzosulfimide dihydrate.
Impurities
Azodisulfonate—5-10 mg/L.
Copper—5 mg/L.
Iron—25 mg/L.
MBSA—(2-methyl benzene sulfonamide)—5-10 mg/L.
Sodium—0.1 g/L.
Sulfate—0.5 g/L.
Operating Parameters Agitation Rate—5 1 linear ft/sec solution flow over the cathode surface.
Cathode (Mandrel)—Current density, 100 to 350 ASF (amps per square foot).
Ramp Rise—0 to operating amps in 2 sec. ±1 sec
Anode—Sulfur depolarized nickel.
Anode to Cathode Ratio—1.2:1.
Deposit Thickness—0.0045 inches.
Mandrel—Chromium plated Aluminum—8 to 15 $\mu$ inch RMS.
Temperature—60° C.

Increases in the electrolyte operating temperature cause a decrease in the cathode and anode diffusion layer thickness and increase in the diffusion rate. Therefore, any electrolyte constituent which is dependent on diffusion to become incorporated into the deposit will be available in larger quantities for that purpose at higher temperatures. If that constituent increases deposit surface roughness, then increases in the electrolyte operating temperature will increase the deposit surface roughness.

The effect of temperature on deposit roughness is not particularly linear, and thus is more difficult to control. The best results are obtained using frequent inspections for deposit roughness followed by small adjustments in operating parameters.

Figure 9:
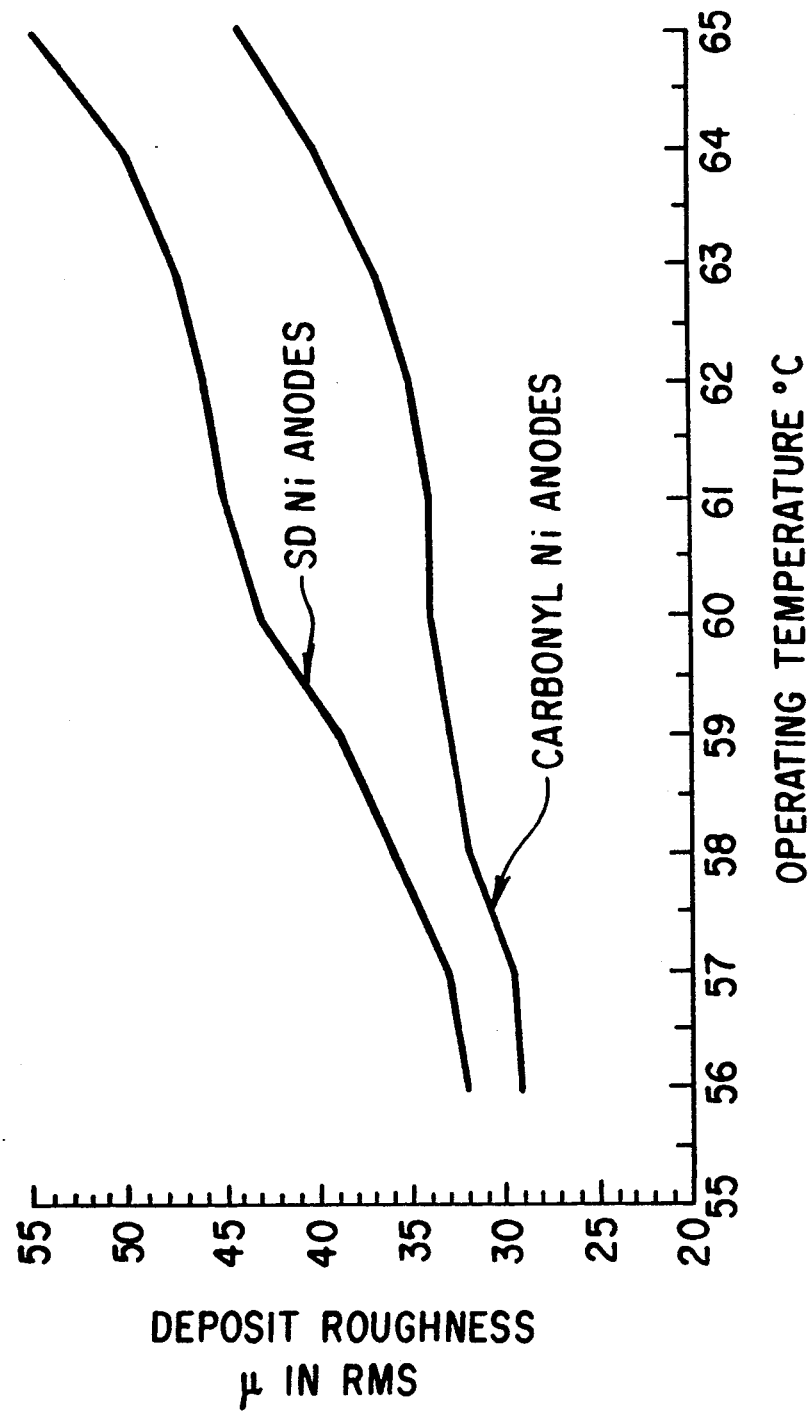
FIG. 9 shows the impact of operating temperature of the electrolyte on deposit roughness.

The relationship between operating temperature and surface roughness for a system having the following operating parameters is shown in FIG. 9:
Major Electrolyte Constituents
Nickel Sulfamate—as $Ni^{+2}$, 12 oz/gal. (90 g/L)
Chloride—as $NiCl_2 \cdot 6H_2O$, 2 oz/gal. (15 g/L)
Boric acid—5 oz/gal. (37.5 g/L)
pH—3.95-4.05 at 23° C.
Surface Tension—at 136° F., 32-37 d/cm using sodium lauryl sulfate (about 0.00525 g/L).
Saccharin—25-30 mg/L, as sodium benzosulfimide dihydrate.
Impurities
Azodisulfonates—5-10 mg/L.
Copper—5 mg/L.
Iron—25 mg/L.
MBSA—(2-methyl benzene sulfonamide)—5-10 mg/L.
Sulfate—0.5 g/L.
Operating Parameters
Agitation Rate—5 linear ft/sec solution flow over the cathode surface.
Cathode (Mandrel)—Current density, 225 ASF (amps per square foot).
Ramp Rise—0 to operating amps in 2 sec. ±1 sec
Anode—Sulfur depolarized nickel and carbonyl nickel.
Anode to Cathode Ratio—1.2:1.
Deposit Thickness—0.0045 inches.
Mandrel—Chromium plated Aluminum—8 to 15 $\mu$ inch RMS.
Temperature—55° to 65° C.

Gas pits may result from a lower pH or an increase in surface tension. While the pH of an electroforming solution is normally between about 3.8 and about 4.2, it has been found that at a pH lower than about 3.8, surface flaws such as gas pitting increase. Thus, by maintaining the pH at this level, a belt can be formed with the desired pitted surface. The pH level may be maintained by the addition of an acid such as sulfamic acid, when necessary. However, it should be noted that internal stress increases at this level and interferes with parting of the electroformed belt from the mandrel.

A lower pH also produces a metal belt with lower tensile strength. At a pH less than about 3.5, the metallic surface of the mandrel can become activated, especially when a chromium plated mandrel is employed, thereby causing the electroformed metal to adhere to the chromium plating. A pH between 3.6 and 3.8 is preferred for producing a pitted belt of this invention by way of pH manipulation.

Control of the pH range is assisted by the addition of a buffering agent such as boric acid, preferably within a range of about 30 g/L to about 38 g/L. When the boric acid concentration drops below about 15 g/L, bath control diminishes and surface flaws increase. When the boric acid concentration exceeds about 41 g/L, precipitation can occur in localized cold spots, thereby interfering with the electroforming process. The boric acid concentration is preferably maintained at about the saturation point at 38° C.

The surface tension of the plating solution may also be adjusted to control pit formation. When the surface tension is adjusted to between about 33 dynes/$cm^2$ to about 37 dynes/$cm^2$, pitting is minimized. Increasing the surface tension to greater than 39 dynes/$cm^2$ will result in increased probability of pitting. The surface tension of the solution may be adjusted to be within this range by adding an anionic surfactant such as sodium lauryl sulfate, sodium alcohol sulfate, sodium hydrocarbon sulfonate and the like. Up to about 0.014 oz/gal of an anionic surfactant may be added to the electroforming solution. A concentration of anionic surfactant sufficient to maintain the surface tension at about 39 dynes/$cm^2$ to about 48 dynes/$cm^2$ will produce suitable surface roughening (pitting) in accordance with the invention.

To electroform an endless metal belt according to the invention, an electroforming zone is created. This zone is preferably created by immersing both the anode and the cathode in a bath comprising a metal salt solution. The anode is selected from a metal and alloys thereof, and the electroforming bath is comprised of a salt solution of the same metal or alloys thereof. The cathode comprises the core mandrel. Of course, one could use an anodic mandrel without undue experimentation.

Any suitable metal capable of being deposited by electroforming and having a coefficient of expansion of between $6 \times 10^{-6}$ in/in/° F. and $10 \times 10^{-6}$ in/in/° F. may be used in the process of this invention. Preferably the electroformed metal has a ductility of at least about 0.5% elongation. Typical metals that may be electroformed include nickel, copper, cobalt, iron, gold, silver, platinum, lead, and the like and alloys thereof.

The core mandrel should be solid and of large mass to prevent cooling of the mandrel while the deposited coating is cooled. Thus the mandrel should have high heat capacity, preferably in the range from about 3 to about 4 times the specific heat of the electroformed article material. This determines the relative amount of heat energy contained in the electroformed article compared to that in the core mandrel.

Further, the core mandrel should exhibit low thermal conductivity to maximize the difference in temperature between the electroformed article and the core mandrel during rapid cooling of the electroformed article to prevent any significant cooling and contraction of the core mandrel.

The materials from which the mandrel and the electroformed article are fabricated are ideally selected to exhibit a different coefficient of thermal expansion to permit easy removal of the belt from the mandrel upon cooling of the assembly. Typical mandrel materials include stainless steel, iron plated with chromium or nickel, nickel, titanium, aluminum plated with chromium or nickel, titanium palladium alloys, nickel-copper alloys such as Inconel 600 and Invar available from Inco, and the like. The outer surface of the mandrel should be passive, i.e., abhesive, relative to the metal that is electrodeposited to prevent adhesion during electroforming. The cross-section of the mandrel may be of any suitable cross-section, including circular, rectangular, triangular, and the like. The surface of the mandrel should be substantially parallel to the axis of the mandrel. Thus, the core mandrel should have a taper of less than about 0.001 inch per foot along the length of the core mandrel.

An exemplary process for electroforming a belt in accordance with the invention is described below.

The electroforming process may be conducted in any suitable electroforming device. For example, a solid cylindrically shaped mandrel may be suspended vertically in an electroplating tank. The mandrel is constructed of electrically conductive material that is compatible with the metal plating solution (e.g., stainless steel.) The top edge of the mandrel may be masked off with a suitable, non-conductive material, such as wax, to prevent deposition.

A typical electrolytic cell for depositing metals such as nickel may comprise a tank containing a rotary drive means including a mandrel-supporting drive hub centrally mounted thereon. The drive means may also provide a low resistance conductive element for conducting a relatively high amperage electrical current between the mandrel and a power supply. The cell is adapted to draw, for example, a peak current of about 30,000 amperes DC at a potential of about 18 volts. Thus, the mandrel comprises the cathode of the cell. An anode electrode for the electrolytic cell comprises an annular shaped basket containing metallic nickel which replenishes the nickel electrodeposited out of the solution. The nickel used for the anode may preferably comprise sulfur depolarized nickel. Non-sulfur depolarized nickel can also be used such as carbonyl nickel, electrolytic nickel and the like. The nickel may be in any suitable form or configuration. The basket is supported within the cell by an annular basket support member which also supports an electroforming solution distributor manifold or sparger which is adapted to introduce electroforming solution to the cell and effect agitation thereof. A relatively high amperage current path within the basket is provided through a contact terminal which is attached to a current supply.

The electroforming tank is filled with a plating solution and the temperature of the plating solution is maintained at the desired temperature. The anode basket is disposed in axial alignment with the mandrel. The mandrel is connected to a rotatable drive shaft driven by a motor. The drive shaft and motor are supported by suitable support members. Either the mandrel or the support for the electroplating tank may be vertically and horizontally movable to allow the mandrel to be moved into and out of the electroplating solution.

Electroforming current can be supplied to the electroforming tank from a suitable DC source. The positive end of the DC source can be connected to the anode basket and the negative end of the DC source connected to the drive shaft which supports and drives the mandrel. The electroforming current passes from the DC source connected to the anode basket, to the plating solution, the mandrel, the drive shaft, and back to the DC source.

In operation, the mandrel is lowered into the electroforming tank and continuously rotated. As the mandrel rotates, a layer of electroformed metal is deposited on its outer surface. This layer is formed to a desired thickness, and to a desired internal stress which will produce a space between adjacent belts. When the layer of deposited metal has reached the desired thickness and internal stress, the mandrel is removed from the electroforming tank and immersed in a cold water bath. When the mandrel is immersed in the cold water bath, the deposited metal is cooled prior to any significant cooling and contracting of the solid mandrel to impart an internal stress of between about 40,000 psi and about 80,000 psi to the deposited metal. The metal belt may then be removed from the mandrel. The deposited metal does not adhere to the mandrel since the mandrel is selected from a passive material. Consequently, as the mandrel shrinks after permanent deformation of the deposited metal, the deposited metal article may be readily slipped off the mandrel.

The belts of this invention may be formed separately on one or more mandrel and removed after each belt is formed, to be assembled in the superimposed "nested" configuration. Alternatively, they may be formed together on the same mandrel, remaining superimposed on the mandrel until the last one is completed and then removed in an assembled state. The belts are preferably kept from adhering to one another by forming a passive layer such as an oxide coating on the outer surface of each belt before forming the next one, as disclosed in detail in U.S. Pat. No. 5,049,243, filed simultaneously herewith and entitled "Electroforming Process for Multilayer Endless Metal Belt Assembly," which is hereby incorporated by reference. In the event that the belt assemblies are constructed with protuberances on the inner surface of the belts, the belts may be formed separately, removed from the mandrel, and reversed, because protuberances are formed only on the bath side during the electroforming process.

The belts may be further improved by electroforming them so that adjacent and opposing belt surfaces are formed of materials of different hardness, such as nickel and chromium, as disclosed in detail in copending application Ser. No. 633025, filed simultaneously herewith and entitled "Endless Metal Assembly Belt with Hardened Belt Surfaces," which is hereby incorporated by reference.

This invention will further be illustrated in the following, non-limiting examples, it being understood that these examples are intended to be illustrative only and that the invention is not intended to be limited to the materials, conditions, process parameters and the like recited therein.

EXAMPLES

IMPACT OF FLOW ON ROUGHNESS AT TWO TEMPERATURES

One Minute Ramp, Low Saccharin

EXAMPLE 1

Major Electrolyte Constituents
Nickel Sulfamate—as $Ni^{+2}$, 11.5 oz/gal. (86.25 g/L)
Chloride—as $NiCl_2 \cdot 6H_2O$, 2.5 oz/gal. (18.75 g/L)
Boric acid—5.0-5.4 oz/gal. (37.5-40.5 g/L)

pH—3.95–4.05 at 23° C.
Surface Tension at 136° F., 32–37 d/cm using sodium lauryl sulfate (about 0.00525 g/L).
Saccharin—15 mg/L, as sodium benzosulfimide dihydrate.
Impurities
Azodisulfonate—6–7 mg/L.
Copper—5 mg/L.
Iron—25 mg/L.
MBSA—(2-methyl benzene sulfonamide)—6–8 mg/L.
Sodium—0.1 g/L.
Sulfate—0.5 g/L.
Operating Parameters
Agitation Rate—5 linear ft/sec cathode rotation and 15–20 L/min solution flow to the 200 L cell.
Cathode (Mandrel)—Current density, 225 ASF (amps per square foot).
Ramp Rise—0 to operating amps in 60 sec. ±5 sec.
Plating Temperature at Equilibrium—135° & 145° F.
Anode—Sulfur depolarized nickel.
Anode to Cathode Ratio—1.5:1.
Mandrel—8 inch diameter chromium plated aluminum—12 $\mu$ inch RMS.

Three 0.003 inch thick belts are made at 135° F. with the solution flow at 15, 17.5 and 20 L/min. The plating temperature at equilibrium is kept at 135° F. by adjusting the temperature of the electrolyte flowing to the cell. The surface roughness of the belts is found to be 12 $\mu$ inch RMS at 15 L/min, 15 $\mu$ inch RMS at 17.5 L/min and 22 $\mu$ inch RMS at 20 L/min. Two more 0.003 inch thick belts are made at 145° F., one at 15 L/min and the other at 20 L/min. The surface roughness of the belts is found to be 18 $\mu$ inch RMS at 15 L/min, and 37 $\mu$ inch RMS at 20 L/min.

Examples 2–4 show a series of chromium-plated nickel belts of decreasing roughness, wherein selected components of the electroforming bath and operating parameters are adjusted. In these three examples, multiple belts are formed superimposed on one another. The temperature is increased to form a gap between each pair of adjacent belts, and the ramp rise is increased to compensate for the increased roughness which occurs when the temperature is increased. The chromium layer is added to prevent the belts from adhering and to provide added hardness to the belts; it is too thin to alter the roughness of the nickel belt to which it adheres.

NICKEL BELTS WITH A CHROMIUM PLATED SURFACE

One Nickel Bath and One Chromium Bath

In Example 2, electroformed belts are formed with a RMS of approximately 15 $\mu$ inch when a relatively higher concentration of nickel ion, higher saccharin concentration, and higher current density are used than in the following two examples.

EXAMPLE 2

NICKEL BATH

Major Electrolyte Constituents
Nickel Sulfamate—as $Ni^{+2}$, 11.5 oz/gal. (86.25 g/L)
Chloride—as $NiCl_2 \cdot 6H_2O$, 2.5 oz/gal. (18.75 g/L)
Boric acid—5.0–5.4 oz/gal. (37.5–40.5 g/L)
pH—3.95–4.05 at 23° C.
Surface Tension—at 60° C., 32–37 d/cm using sodium lauryl sulfate (about 0.00525 g/L).
Saccharin—30 mg/L, as sodium benzosulfimide dihydrate.
Impurities
Azodisulfonate—5–7 mg/L.
Cobalt—0.09 g/L.
Copper—5 mg/L.
Iron—25 mg/L.
MBSA—(2-methyl benzene sulfonamide)—5–6 mg/L.
Sodium—0.1 g/L.
Sulfate 0.5 g/L.
Operating Parameters
Agitation Rate—150 linear cm/sec cathode rotation and 100 L/min solution flow to the 400 L cell.
Cathode (Mandrel)—Current density, 24 ASD (amperes per square decimeter).
Anode—Carbonyl nickel.
Anode to Cathode Ratio—1.5:1.
Mandrel—20 cm diameter chromium plated aluminum—5 $\mu$ inch RMS.

|  | 1ST RUN | 2ND RUN | 3RD RUN | 4TH RUN | 5TH RUN | 6TH RUN | 7TH RUN | 8TH RUN |
|---|---|---|---|---|---|---|---|---|
| TEMPERATURE °C. | 53 | 54 | 55 | 56 | 57 | 58 | 59 | 60 |
| DEPOSIT THICKNESS | 0.0762 mm for all runs. | | | | | | | |
| RAMP RISE Sec. | 100 | 110 | 110 | 120 | 120 | 135 | 143 | 150 |
| ROUGHNESS $\mu$ inch RMS | 15 | 14 | 15 | 14 | 15 | 15 | 15 | 15 |

RINSE WATER

Specific Resistance—1.5 Meg Ohm—cm, at 25° C.

|  | 1ST RUN | 2ND RUN | 3RD RUN | 4TH RUN | 5TH RUN | 6TH RUN | 7TH RUN | 8TH RUN |
|---|---|---|---|---|---|---|---|---|
| TEMPERATURE °C. | 53 | 54 | 55 | 56 | 57 | 58 | 59 | 60 |

CHROMIUM BATH

Major Electrolyte Constituents
$CrO_3$—172 g/L
Fluoride—as $F^-$ 0.7 g/L
$SO_4^=$ —1.35 g/L
Impurities
Copper—10 mg/L.
Iron—65 g/L.
Sodium—3 g/L.
Operating Parameters
Agitation Rate—5 linear cm/sec cathode rotation and 60 L/min solution flow to the 800 L cell.
Cathode (Mandrel)—Current density, 15.6 ASD (amps per square decimeter).
Ramp Rise—0 to operating amps in 1 sec. ±0.5 sec.
Anode—Lead with tin at 8% by weight.

|  | 1ST RUN | 2ND RUN | 3RD RUN | 4TH RUN | 5TH RUN | 6TH RUN | 7TH RUN | 8TH RUN |
| --- | --- | --- | --- | --- | --- | --- | --- | --- |
| TEMPERATURE °C. | 53 | 54 | 55 | 56 | 57 | 58 | 59 | 60 |
| DEPOSIT THICKNESS | 0.00127 mm for all runs. | | | | | | | |

The first electroformed belt is prepared on a mandrel preheated to the temperature of the first nickel bath and removed from that bath at a rate of 180 cm/min. As soon as the mandrel with the first electroformed nickel belt reaches the traveling height (30 cm) above the nickel bath, the electroformed nickel belt is rinsed for 6 complete revolutions with rinse water at 53° C. and a flow rate of 3 L/min. The speed of rotation at this step is 750 linear cm/min. Care is taken to make sure that all traces of the nickel bath are removed from both the mandrel and the nickel belt and that the nickel belt surface remains wet with rinse water. The input temperature of the nickel bath is adjusted to 54° C.

The mandrel with the first nickel belt is then moved to a position over the chromium plating bath. The belt is kept wet during this time by continuing to rotate the composite mandrel with the first belt and rinsing with the 53° C. rinse water.

The flow of rinse water is then terminated and the first belt on the mandrel is immediately submerged in the chromium plating bath at a speed of 180 cm/min. The rotation is then reduced to 320 linear cm/min while quickly applying 15.6 amperes per square decimeter. The mandrel with the first belt is left in this situation for six minutes. The mandrel with the first nickel belt, which is now chromium plated, is removed from that bath at a rate of 180 cm/min after terminating the current. As soon as the mandrel with the first chromium plated electroformed nickel belt reaches the traveling height (30 cm) above the chromium bath, the chromium plated electroformed nickel belt is rinsed for 6 complete revolutions with rinse water at 54° C. and a flow rate of 3 L/min. The speed of rotation at this step is 750 linear cm/min. Care is taken to make sure that all traces of the chromium bath are removed from the mandrel, the associated equipment, and the chromium plated nickel belt and that the chromium plated surface remains wet with rinse water. The input temperature of the chromium bath is adjusted to 54° C.

The mandrel with the first chromium plated nickel belt is then moved to a position over the nickel plating bath. The belt is kept wet during this time by continuing to rotate the composite mandrel with the first belt and rinsing with the 54° C. rinse water.

The flow of rinse water is then terminated and the first chromium plated belt on the mandrel is immediately submerged in the nickel plating bath at a speed of 180 cm/min. The temperature of the electroforming zone in this bath is found to be 54° C. The rotation is increased, current is applied, and the second electroformed nickel belt is deposited during the next 16.5 minutes as described above.

This process is repeated eight times. At each step the temperature of the rinse water, the chromium electroplating zone and the nickel electroforming zone is increased by 1° C. The time to come to full current density is also changed to minimize the impact of the increasing electrolyte temperature on surface roughness of the deposit.

After seven chromium plated nickel belts and one unplated nickel belt are obtained one on top of the other and given a final rinse, the eight belts and the mandrel are cooled to 5° C. in a cold water bath. Upon removal from this cold water, the belts are removed from the mandrel as a group and are able to move independently of each other.

NICKEL BELTS WITH A SMOOTH CHROMIUM PLATED SURFACE

Using One Nickel Bath and One Chromium Bath

EXAMPLE 3

In Example 3, electroformed belts with a RMS of approximately 5 $\mu$ inch are formed when the nickel ion concentration is decreased by 2 oz/gal from the previous example.

NICKEL BATH

Major Electrolyte Constituents
Nickel Sulfamate—as $Ni^{+2}$, 9.5 oz/gal. (71.25 g/L)
Chloride—as $NiCl_2 \cdot 6H_2O$, 2.5 oz/gal. (18.75 g/L)
Boric acid—5.0–5.4 oz/gal. (37.5–40.5 g/L)
pH—3.95–4.05 at 23° C.
Surface Tension—at 60° C, 32–37 d/cm using sodium lauryl sulfate (about 0.00525 g/L).
Saccharin—30 mg/L, as sodium benzosulfimide dihydrate.
Impurities
Azodisulfonate—5–7 mg/L.
Cobalt—0.09 g/L.
Copper—5 mg/L.
Iron—25 mg/L.
MBSA—(2-methyl benzene sulfonamide)—5–6 mg/L.
Sodium—0.1 gm/L.
Sulfate—0.5 g/L.
Operating Parameters
Agitation Rate—150 linear cm/sec cathode rotation and 100 L/min solution flow to the 400 L cell.
Cathode (Mandrel)—Current density, 24 ASD (amperes per square decimeter).
Anode—Carbonyl Nickel.
Anode to Cathode Ratio—1.5:1.
Mandrel—20 cm diameter chromium plated aluminum—5 $\mu$ inch RMS.

|  | 1ST RUN | 2ND RUN | 3RD RUN | 4TH RUN | 5TH RUN | 6TH RUN | 7TH RUN | 8TH RUN |
| --- | --- | --- | --- | --- | --- | --- | --- | --- |
| TEMPERATURE °C. | 53 | 54 | 55 | 56 | 57 | 58 | 59 | 60 |
| DEPOSIT THICKNESS | 0.0762 mm for all runs. | | | | | | | |
| RAMP RISE Sec. | 100 | 110 | 110 | 120 | 120 | 135 | 143 | 150 |
| ROUGHNESS $\mu$ inch RMS | 5 | 4 | 5 | 4 | 5 | 5 | 5 | 5 |

RINSE WATER

Specific Resistance—1.5 Meg Ohm—cm, at 25° C.

|  | 1ST RUN | 2ND RUN | 3RD RUN | 4TH RUN | 5TH RUN | 6TH RUN | 7TH RUN | 8TH RUN |
|---|---|---|---|---|---|---|---|---|
| TEMPERATURE °C. | 53 | 54 | 55 | 56 | 57 | 58 | 59 | 60 |

CHROMIUM BATH

Major Electrolyte Constituents $CrO_3$—172 g/L
Fluoride—as $F^-$ 0.7 g/L
$SO_4^=$ —1.35 g/L
Impurities
Copper—10 mg/L.
Iron—65 mg/L.
Sodium—0.3 gm/L.
Operating Parameters
Agitation Rate—5 linear cm/sec cathode rotation and 60 L/min solution flow to the 800 L cell.
Current density, 15.6 ASD (amps per square decimeter).
Ramp Rise—0 to operating amps in 1 sec. ±0.5 sec.
Anode—Lead with tin at 8% by weight.
Anode to Cathode Ratio—2.5:1.

|  | 1ST RUN | 2ND RUN | 3RD RUN | 4TH RUN | 5TH RUN | 6TH RUN | 7TH RUN | 8TH RUN |
|---|---|---|---|---|---|---|---|---|
| TEMPERATURE °C. | 53 | 54 | 55 | 56 | 57 | 58 | 59 | 60 |
| DEPOSIT THICKNESS | | | | 0.00127 mm for all runs. | | | | |

The first electroform is prepared on a mandrel preheated to the temperature of the first nickel bath, and removed from that bath at a rate of 180 cm/min. As soon as the mandrel with the first electroformed nickel belt reaches the traveling height (30 cm) above the nickel bath, the electroformed nickel belt is rinsed for 6 complete revolutions with rinse water at 53° C. and a flow rate of 3 L/min. The speed of rotation at this step is 750 linear cm/min. Care is taken to make sure that all traces of the nickel bath are removed from both the mandrel and the nickel belt and that the nickel belt surface remains wet with rinse water. The input temperature of the nickel bath is adjusted to 54° C.

The mandrel with the first nickel belt is then moved to a position over the chromium plating bath. The belt is kept wet during this time by continuing to rotate the composite mandrel with the first belt and rinsing with the 53° C. rinse water.

The flow of rinse water is then terminated and the first belt on the mandrel is immediately submerged in the chromium plating bath at a speed of 180 cm/min. The rotation is then reduced to 320 linear cm/min while quickly applying 15.6 amperes per square decimeter. The mandrel with the first belt is left in this situation for six minutes. The mandrel with the first nickel belt, which is now chromium plated, is removed from that bath at a rate of 180 cm/min after terminating the current. As soon as the mandrel with the first chromium plated electroformed nickel belt reaches the traveling height (30 cm) above the chromium bath, the chromium plated electroformed nickel belt is rinsed for 6 complete revolutions with rinse water at 54° C. and a flow rate of 3 L/min. The speed of rotation at this step is 750 linear cm/min. Care is taken to make sure that all traces of the chromium bath are removed from the mandrel, the associated equipment, and the chromium plated nickel belt and that the chromium plated surface remains wet with rinse water. The input temperature of the chromium bath is adjusted to 54° C.

The mandrel with the first chromium plated nickel belt is then moved to a position over the nickel plating bath. The belt is kept wet during this time by continuing to rotate the composite mandrel with the first belt and rinsing with the 54° C. rinse water.

The flow of rinse water is then terminated and the first chromium plated belt on the mandrel is immediately submerged in the nickel plating bath at a speed of 180 cm/min. The temperature of the electroforming zone in this bath is found to be 54° C. The rotation is increased, current is applied, and the second electroformed nickel belt is deposited during the next 16.5 minutes as described above.

This process is repeated eight times. At each step the temperature of the rinse water, the chromium electroplating zone and the nickel electroforming zone is increased by 1° C. The time to come to full current density is also changed to minimize the impact of the increasing electrolyte temperature on surface roughness of the deposit.

After seven chromium plated nickel belts and one unplated nickel belt are obtained one on top of the other and given a final rinse, the eight belts and the mandrel are cooled to 5° C. in a water bath. Upon removal from this cold water, the belts are removed from the mandrel as a group and are found to be free to move independently of each other.

NICKEL BELTS WITH A SMOOTHER CHROMIUM PLATED SURFACE

Using One Nickel Bath and One Chromium Bath

EXAMPLE 4

In Example 4, a much smoother surface than the previous two examples is formed when the nickel ion concentration is decreased by 1.5 oz/gal, the chloride concentration and saccharin concentrations are decreased, and a leveler is added to the bath. Current density is also decreased in this example.

NICKEL BATH

Major Electrolyte Constituents
Nickel Sulfamate—as $Ni^{+2}$, 8 oz/gal. (60 g/L)
Chloride—as $NiCl_2 \cdot 6H_2O$, 2 oz/gal. (15 g/L)
Boric acid—5.0–5.4 oz/gal. (37.5–40.5 g/L)
pH—3.95–4.05 at 23° C.
Surface Tension—at 60° C., 32–37 d/cm using sodium lauryl sulfate (about 0.00525 g/L).
Saccharin—20 mg/L, as sodium benzosulfimide dihydrate Leveler—14 mg/L, as 2-butyne-1-4 diol
Impurities
Azodisulfonate—5-7 mg/L.
Cobalt—0.09 g/L.
Copper—5 mg/L.
Iron—25 mg/L.
MBSA—(2-methyl benzene sulfonamide)—4-6 mg/L.
Sodium—0.1 g/L.
Sulfate 0.5 g/L.
Operating Parameters
Agitation Rate—150 linear cm/sec cathode rotation and 100 L/min solution flow to the 400 L cell.
Cathode (Mandrel)—Current density, 20 ASD (amperes per square decimeter).
Anode—Carbonyl nickel.
Anode to Cathode Ratio—1.5:1.
Mandrel—20 cm diameter chromium plated aluminum—0.8 μ inch RMS

|  | 1ST RUN | 2ND RUN | 3RD RUN | 4TH RUN | 5TH RUN | 6TH RUN | 7TH RUN | 8TH RUN |
| --- | --- | --- | --- | --- | --- | --- | --- | --- |
| TEMPERATURE °C. | 53 | 54 | 55 | 56 | 57 | 58 | 59 | 60 |
| DEPOSIT THICKNESS | 0.0762 mm for all runs. | | | | | | | |
| RAMP RISE | 100 | 110 | 110 | 120 | 120 | 135 | 143 | 150 |
| ROUGHNESS μ inch RMS | 0.5 | 0.4 | 0.6 | 0.4 | 0.6 | 0.5 | 0.4 | 0.5 |

RINSE WATER

Specific Resistance—1.5 Meg Ohm—cm, at 25° C.

|  | 1ST RUN | 2ND RUN | 3RD RUN | 4TH RUN | 5TH RUN | 6TH RUN | 7TH RUN | 8TH RUN |
| --- | --- | --- | --- | --- | --- | --- | --- | --- |
| TEMPERATURE °C. | 53 | 54 | 55 | 56 | 57 | 58 | 59 | 60 |

CHROMIUM BATH

Major Electrolyte Constituents
$CrO_3$—172 g/L
Fluoride—as $F^-$ 0.7 g/L
$SO_4^=$—35 g/L
Impurities
Copper—10 mg/L.
Iron—65 Mg/L.
Sodium—0.3 g/L.
Operating Parameters
Agitation Rate—5 linear cm/sec cathode rotation and 60 L/min solution flow to the 800 L cell.
Cathode (Mandrel)—Current density, 15.6 ASD (amps per square decimeter).
Ramp Rise—0 to operating amps in 1 sec. ±0.5 sec.
Anode—Lead with tin at 8% by weight.
Anode to Cathode Ratio—2.5:1.

|  | 1ST RUN | 2ND RUN | 3RD RUN | 4TH RUN | 5TH RUN | 6TH RUN | 7TH RUN | 8TH RUN |
| --- | --- | --- | --- | --- | --- | --- | --- | --- |
| TEMPERATURE °C. | 53 | 54 | 55 | 56 | 57 | 58 | 59 | 60 |
| DEPOSIT THICKNESS | 0.00127 mm for all runs. | | | | | | | |

The first electroform is prepared on a mandrel preheated to the temperature of the first nickel bath, and removed from that bath at a rate of 180 cm/min. As soon as the mandrel with the first electroformed nickel belt reaches the traveling height (30 cm) above the nickel bath, the electroformed nickel belt is rinsed for 6 complete revolutions with rinse water at 53° C. and a flow rate of 3 L/min. The speed of rotation at this step is 750 linear cm/min. Care is taken to make sure that all traces of the nickel bath are removed from both the mandrel and the nickel belt and that the nickel belt surface remains wet with rinse water. The input temperature of the nickel bath is adjusted to 54° C.

The mandrel with the first nickel belt is then moved to a position over the chromium plating bath. The belt is kept wet during this time by continuing to rotate the composite mandrel with the first belt and rinsing with the 53° C. rinse water.

The flow of rinse water is then terminated and the first belt on the mandrel is immediately submerged in the chromium plating bath at a speed of 180 cm/min. The rotation is then reduced to 320 linear cm/min while quickly applying 15.6 amperes per square decimeter. The mandrel with the first belt is left in this situation for six minutes. The mandrel with the first nickel belt, which is now chromium plated, is removed from that bath at a rate of 180 cm/min after terminating the current. As soon as the mandrel with the first chromium plated electroformed nickel belt reaches the traveling height (30 cm) above the chromium bath, the chromium plated electroformed nickel belt is rinsed for 6 complete revolutions with rinse water at 54° C. and a flow rate of 3 L/min. The speed of rotation at this step is 750 linear cm/min. Care is taken to make sure that all traces of the chromium bath are removed from the mandrel, the associated equipment, and the chromium plated nickel belt and that the chromium plated surface remains wet with rinse water. The input temperature of the chromium bath is adjusted to 54° C.

The mandrel with the first chromium plated nickel belt is then moved to a position over the nickel plating bath. The belt is kept wet during this time by continuing to rotate the composite mandrel with the first belt and rinsing with the 54° C. rinse water.

The flow of rinse water is then terminated and the first chromium plated belt on the mandrel is immediately submerged in the nickel plating bath at a speed of 180 cm/min. The temperature of the electroforming zone in this bath is 54° C. The rotation is increased, current is applied, and the second electroformed nickel belt is deposited during the next 19.8 minutes as described above.

This process is repeated eight times. At each step the temperature of the rinse water is increased by 1° C. as well as the chromium electroplating zone and the nickel electroforming zone. The time to come to full current density is also changed to minimize the impact of the increasing electrolyte temperature on surface roughness of the deposit.

After seven chromium plated nickel belts and one unplated nickel belt are obtained one on top of the other and given a final rinse, the eight belts and the mandrel are cooled to 5° C. in a water bath. Upon removal from this cold water, the belts are removed from the mandrel as a group and are found to be free to move independently of each other.

GAS PITS

EXAMPLE 5

Major Electrolyte Constituents
Nickel Sulfamate—as $Ni^{+2}$, 11.5 oz/gal. (86.25 g/L)
Chloride—as $NiCl_2 \cdot 6H_2O$, 2 oz/gal. (15 g/L)
Boric acid—5.0–5.4 oz/gal. (37.5–40.5 g/L)
pH—3.70–3.75 at 23° C.
Surface Tension—at 136° C., F,40–44 dynes/cm using sodium lauryl sulfate.
Saccharin—15 mg/L, as sodium benzosulfimide dihydrate
Impurities
Azodisulfonate—6–7 mg/L.
Copper—5 mg/L.
Iron—25 mg/L.
MBSA—(2-methyl benzene sulfonamide)—6–8 mg/L.
Sodium—0.1 g/L.
Sulfate 0.5 g/L.
Operating Parameters
Agitation Rate—5 linear ft/sec cathode rotation and 20 L/min solution flow to the 200 L cell.
Cathode (Mandrel)—Current density, 225 ASF (amps per square foot).
Ramp Rise—0 to operating amps in 60 sec.±5 sec.
Anode—Carbonyl nickel.
Anode to Cathode Ratio—1.5:1.
Mandrel—8 inch diameter chromium plated aluminum—12 $\mu$ inch RMS
Temperature—62° C.

Three 0.003 inch thick belts are made at 40 dynes/cm. The surface of the belts is 25 $\mu$ inch RMS and covered with gas pits at a density of about 250 per square cm. Two more 0.003 inch thick belts are made at 44 dynes/cm. The surface of the belts is 28 $\mu$ inch RMS and covered with gas pits at a density of about 800/cm².

What is claimed is:

1. An endless metal drive belt assembly comprising:
   an endless first metal drive belt having an outer surface;
   an endless second metal drive belt movable relative to and surrounding said first metal drive belt and having an inner surface adjacent to and opposing said outer surface; and
   a gap between said adjacent and opposing surfaces defining means for containing lubricant therein;
   wherein the surface geography of at least one of said outer surface and said inner surface as determined by the presence of at least one of (a) a substantially uniformly distrusted plurality of (i) protuberances with a maximum peak to valley distance equal to about 95% of a width of said gap, or (ii) indentations, and (b) pits in the form of through-holes is controlled by variation of parameters of the forming process to retain lubricant between said adjacent and opposing surfaces; wherein said at least one of protuberances, indentations and pits is capable of enhancing lubricant circulation between said first and second belts.

2. An assembly of claim 1, wherein at least one of said inner surface and said outer surface contains indentations and the other of said inner surface and said outer surface contains protuberances, and said indentations and protuberances do not precisely mate.

3. An assembly of claim 1, wherein both said inner surface and said outer surface contain indentations.

4. An assembly of claim 1, wherein both said inner surface and said outer surface contain protuberances.

5. An assembly of claim 1, wherein at least one of said inner surface and said outer surface contains pits.

6. An assembly of claim wherein both said inner surface and said outer surface contain pits.

7. An assembly of claim wherein both said inner surface and said outer surface contain protuberances and pits.

8. An assembly of claim 1, wherein both said inner surface and said outer surface contain indentations and pits.

9. An assembly of claim 1, wherein one of said inner surface and said outer surface is smooth.

10. An assembly of claim 1, wherein said maximum peak to valley distance of said protuberances is $\leq 50\%$ of said width.

11. An assembly of claim 1, wherein said maximum peak to valley distance of said protuberances is $\leq 10\%$ of said width.

12. An assembly of claim 1, wherein said maximum peak to valley distance of said protuberances is $\leq 1\%$ of said width.

13. An assembly of claim 1, containing said protuberances with a height of about 3 to about 40 $\mu$ inch RMS.

14. An assembly of claim 13, wherein said height is about 3 to about 20 $\mu$ inch RMS.

15. An assembly of claim 13, wherein said maximum peak to valley distance of said protuberances is about 0.000008 to 0.000315 inches.

16. An assembly of claim 1, wherein diameters of the protuberances and indentations are about 0.00001 to about 0.005 inch.

17. A process of preparing an endless metal drive belt assembly, comprising:
   forming an endless first metal drive belt having an outer surface;
   forming an endless second metal drive belt movable relative to and surrounding said first metal drive belt and having an inner surface adjacent to and opposing said outer surface;
   wherein a gap is formed between said first belt and said second belt defining means for containing lubricant therein; and
   wherein at least one of said outer surface and said inner surface comprises at least one of (a) a substantially uniformly distrusted plurality of (i) protuberances with a maximum peak to valley distance equal to about 95% of a width of said gap, or (ii) indentations, and (b) pits in the form of throughholes; wherein said at least one of protuberances, indentations and pits is capable of enhancing lubricant circulation between said first and second belts.

18. The process of claim 17, wherein at least one of said inner surface and said outer surface contains indentations and the other of said inner surface and said outer surface contains protuberances, and said indentations and protuberances do not precisely mate.

19. A process of preparing an endless metal drive belt assembly by electroforming comprising:

determining parameters of an electroforming process which will form a surface on an electroformed metal drive belt having a geography which contains at least one of (a) a substantially uniformly distrusted plurality of (i) protuberances with a maximum peak to valley distance equal to about 95% of a width of a predetermined gap for containing lubricant between adjacent belt surfaces of said belt assembly, or (ii) indentations, and (b) pits in the form of through-holes; wherein said at least one of protuberances, indentations and pits is capable of enhancing lubricant circulation between said first and second belts; and electroforming an endless first metal drive belt having an outer surface and an endless second metal drive belt movable relative to and surrounding said first metal drive belt and having an inner surface adjacent to and opposing said outer surface; wherein at least one of said surfaces is electroformed in accordance with said parameters.

20. The process of claim 19, wherein each belt is electroformed separately and thereafter assembled into said belt assembly.

21. The process of claim 19, wherein all the belts of the assembly are electroformed on the same mandrel, one on top of another.

22. The process of claim 19, wherein a mandrel comprising a rough surface is used to form said geography.

23. The process of claim 19, wherein metal ion concentration in said electroforming process is used to form said geography.

24. The process of claim 19, wherein ramp current application in said electroforming process is used to form said geography.

25. The process of claim 19, wherein current density in said electroforming process is used to form said geography.

26. The process of claim 19, wherein temperature of the electroforming bath in said electroforming process is used to form said geography.

* * * * *